US012619735B2

(12) United States Patent
Kasarabada et al.

(10) Patent No.: US 12,619,735 B2
(45) Date of Patent: May 5, 2026

(54) PERFORMING ACTION BASED ON MAPPING OF RUNTIME RESOURCE TO HIERARCHY OF ASSETS UTILIZED DURING DEVELOPMENT OF CODE

(71) Applicant: Microsoft Technology Licensing, LLC, Redmond, WA (US)

(72) Inventors: Lavanya U. Kasarabada, Woodinville, WA (US); Sarika Calla, Kirkland, WA (US); Ayala Miller, Bellevue, WA (US); Laveesh Rohra, Seattle, WA (US); Jose Miguel Parrella Romero, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 18/191,834

(22) Filed: Mar. 28, 2023

(65) Prior Publication Data

US 2024/0330475 A1     Oct. 3, 2024

(51) Int. Cl.
    G06F 21/62     (2013.01)
    G06F 21/57     (2013.01)
    G06F 21/60     (2013.01)
(52) U.S. Cl.
    CPC ................................. G06F 21/577 (2013.01)
(58) Field of Classification Search
    CPC .................................................... G06F 21/577
    USPC ............................................................. 726/1
    See application file for complete search history.

(56) References Cited

U.S. PATENT DOCUMENTS

| | | | | |
|---|---|---|---|---|
| 10,579,806 B1 * | 3/2020 | Pyo | ....................... | H04L 9/0891 |
| 11,288,061 B1 | 3/2022 | Johnson | | |
| 12,015,630 B1 * | 6/2024 | Cross | .................. | H04L 63/1433 |
| 2014/0244488 A1 | 8/2014 | Kim et al. | | |
| 2016/0217423 A1 * | 7/2016 | Magnan | ............... | G06Q 10/103 |
| 2019/0052729 A1 * | 2/2019 | Zhou | ....................... | H04L 67/02 |

(Continued)

FOREIGN PATENT DOCUMENTS

| | | | | | |
|---|---|---|---|---|---|
| CN | 112041832 A | * | 12/2020 | ......... | G06F 16/2393 |
| WO | WO-2019095936 A1 | * | 5/2019 | ............... | G06F 8/41 |
| WO | 2022119693 A1 | | 6/2022 | | |

OTHER PUBLICATIONS

"About webhooks", Retrieved From: https://docs.github.com/en/developers/webhooks-and-events/webhooks/about-webhooks, Retrieved on: Oct. 6, 2022, 2 Pages.

(Continued)

*Primary Examiner* — Haresh N Patel
(74) *Attorney, Agent, or Firm* — Wade IP Law PLLC

(57)     ABSTRACT

Techniques are described herein that are capable of performing an action based on mapping of a runtime resource to a hierarchy of assets utilized during development of code. A hierarchy of assets that are utilized during development of code on a user machine is identified (e.g., automatically identified). The assets in the hierarchy are included in respective hierarchical levels that correspond to respective asset types. A runtime resource, which is created by deployment of the code on a server machine that is coupled to the user machine via a network, is mapped (e.g., automatically mapped) to the assets in the hierarchy. An action is performed with regard to an identified asset, which is included among the assets in the hierarchy, based at least on the runtime resource being mapped to the identified asset.

21 Claims, 13 Drawing Sheets

(56) References Cited

U.S. PATENT DOCUMENTS

| | | | | |
|---|---|---|---|---|
| 2022/0311794 A1 | | 9/2022 | Maya | |
| 2023/0305896 A1* | | 9/2023 | Wood | H04L 9/0894 |
| 2024/0045786 A1* | | 2/2024 | Bell | G06F 11/3696 |
| 2024/0291724 A1* | | 8/2024 | Saha | H04L 41/16 |

OTHER PUBLICATIONS

"Docker Images", Retrieved From: https://docs.docker.com/engine/reference/commandline/images/#list-the-most-recently-created-images, Retrieved on: Oct. 6, 2022, 9 Pages.

"Metadata syntax for GitHub Actions", Retrieved From: https://docs.github.com/en/actions/creating-actions/metadata-syntax-for-github-actions#runspre, Retrieved on: Oct. 6, 2022, 19 Pages.

"Webhook Events and Payloads", Retrieved From: https://docs.github.com/en/developers/webhooks-and-events/webhooks/webhook-events-and-payloads#/workflow_run, Retrieved on: Oct. 6, 2022, 94 Pages.

"Webhooks All Tiers", Retrieved From: https://docs.gitlab.com/ee/user/project/integrations/webhooks.html, Retrieved on: Oct. 6, 2022, 7 Pages.

Andrica, et al., "Service hooks events", Retrieved From: https://learn.microsoft.com/en-us/azure/devops/service-hooks/events?view=azure-devops#build.complete, Dec. 13, 2022, 69 Pages.

Cooper, et al., "Author a pipeline decorator", Retrieved From: https://learn.microsoft.com/en-us/azure/devops/extend/develop/add-pipeline-decorator?view=azure-devops, Jan. 28, 2023, 9 Pages.

Danielson, et al., "Integrate with Service Hooks", Retrieved From: https://learn.microsoft.com/en-us/azure/devops/service-hooks/overview?view=azure-devops, Nov. 28, 2022, 10 Pages.

Gunda, et al., "Azure Cosmos DB service quotas", Retrieved From: https://github.com/MicrosoftDocs/azure-docs/blob/main/articles/cosmos-db/concepts-limits.md#azure-cosmos-db-service-quotas, Retrieved on: Oct. 6, 2022, 14 pages.

Mader, et al., "Task Types & Usage", Retrieved From: https://learn.microsoft.com/en-us/azure/devops/pipelines/process/tasks?view=azure-devops&tabs=yaml#/task-control-options, Dec. 22, 2022, 8 Pages.

International Search Report and Written Opinion received for PCT Application No. PCT/US2024/019617, Jul. 23, 2024, 15 pages.

International Preliminary Report on Patentability (Chapter I) received for PCT Application No. PCT/US2024/019617, (Ms# 412673-PCT01) Oct. 9, 2025, 10 pages.

\* cited by examiner

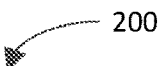

200

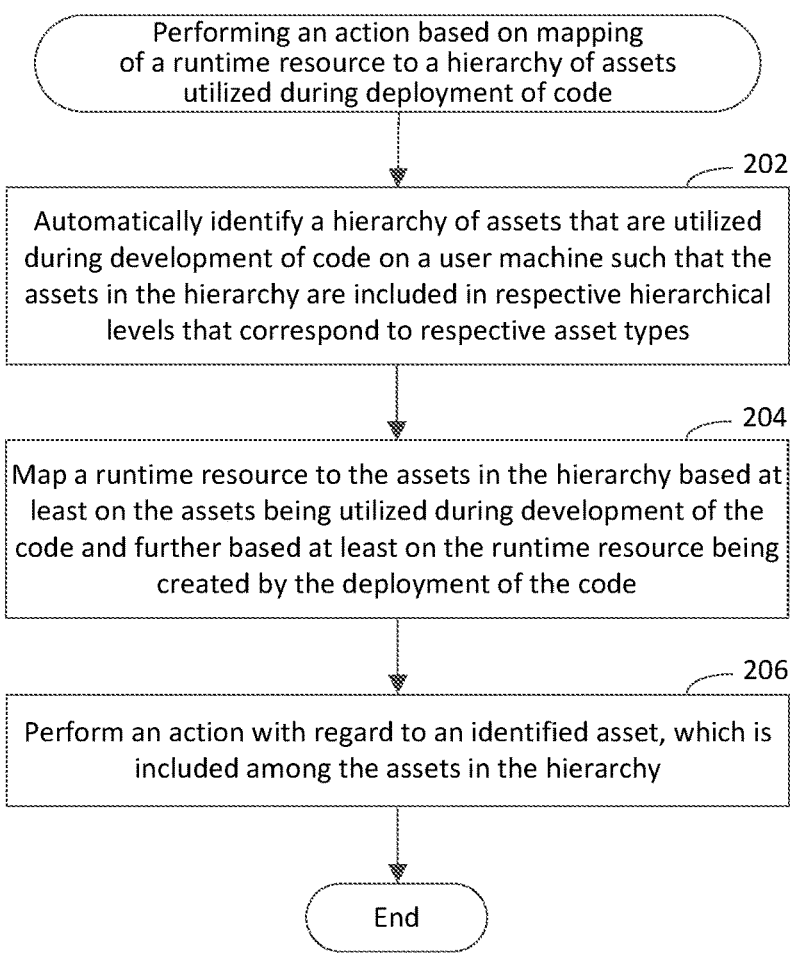

Performing an action based on mapping
of a runtime resource to a hierarchy of assets
utilized during deployment of code

202

Automatically identify a hierarchy of assets that are utilized
during development of code on a user machine such that the
assets in the hierarchy are included in respective hierarchical
levels that correspond to respective asset types

204

Map a runtime resource to the assets in the hierarchy based at
least on the assets being utilized during development of the
code and further based at least on the runtime resource being
created by the deployment of the code

206

Perform an action with regard to an identified asset, which is
included among the assets in the hierarchy End

FIG. 2

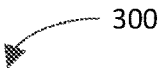
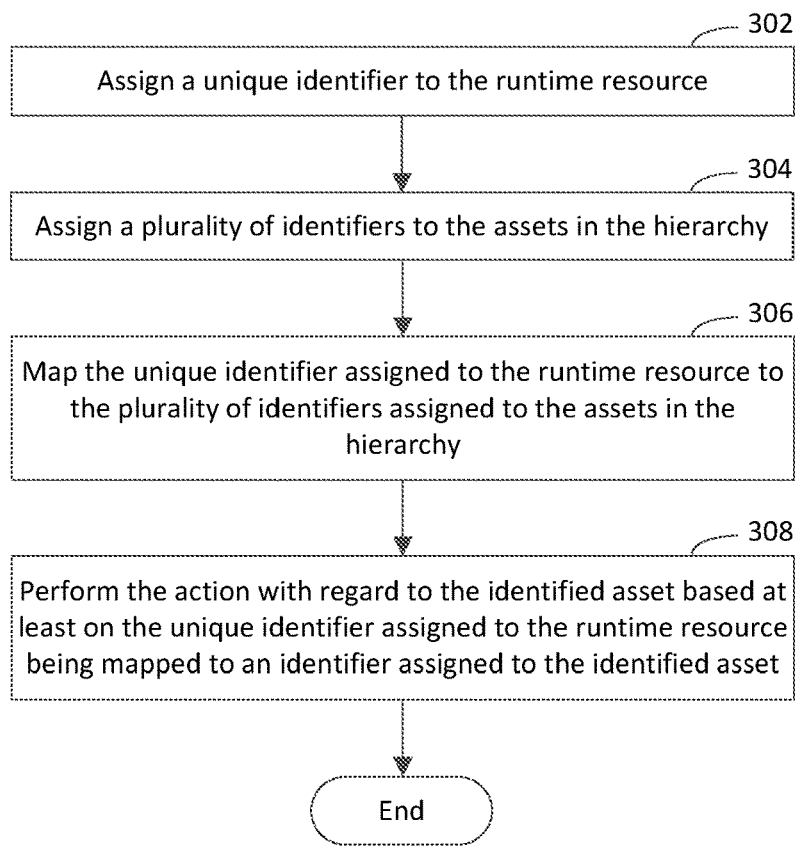
FIG. 3

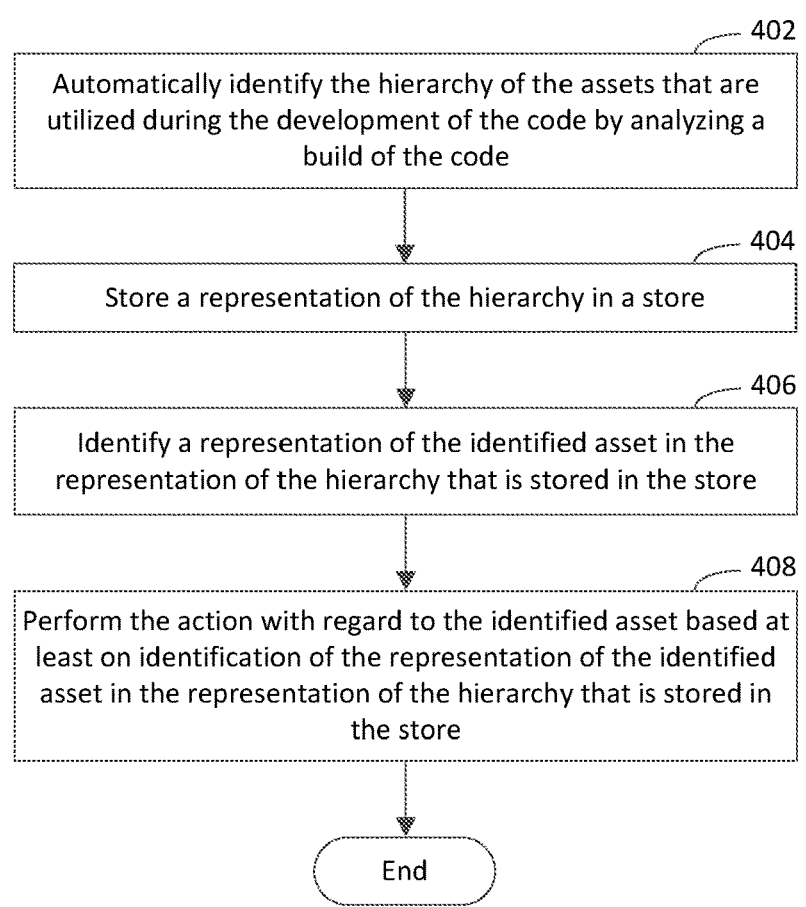
FIG. 4

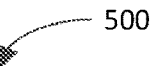

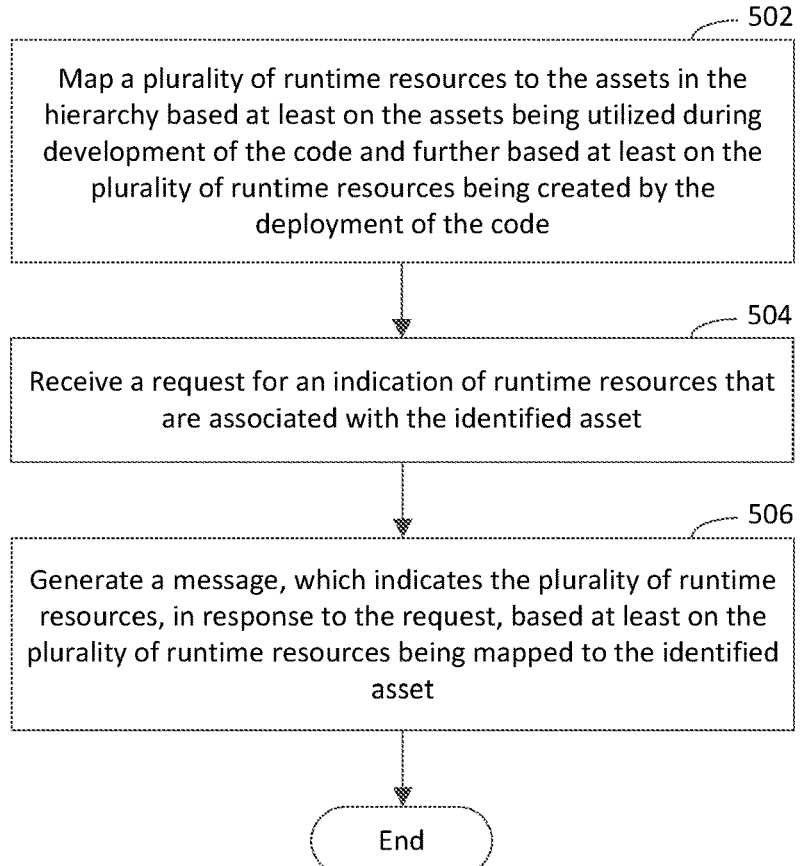

500

502

Map a plurality of runtime resources to the assets in the hierarchy based at least on the assets being utilized during development of the code and further based at least on the plurality of runtime resources being created by the deployment of the code

504

Receive a request for an indication of runtime resources that are associated with the identified asset

506

Generate a message, which indicates the plurality of runtime resources, in response to the request, based at least on the plurality of runtime resources being mapped to the identified asset End

FIG. 5

600

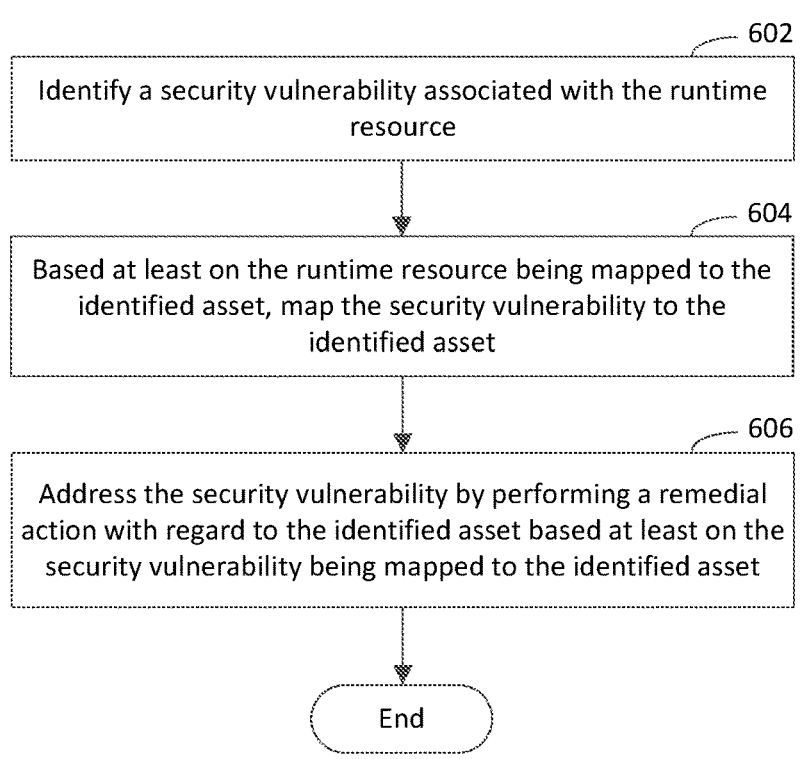

602

Identify a security vulnerability associated with the runtime resource

604

Based at least on the runtime resource being mapped to the identified asset, map the security vulnerability to the identified asset

606

Address the security vulnerability by performing a remedial action with regard to the identified asset based at least on the security vulnerability being mapped to the identified asset End

FIG. 6

700

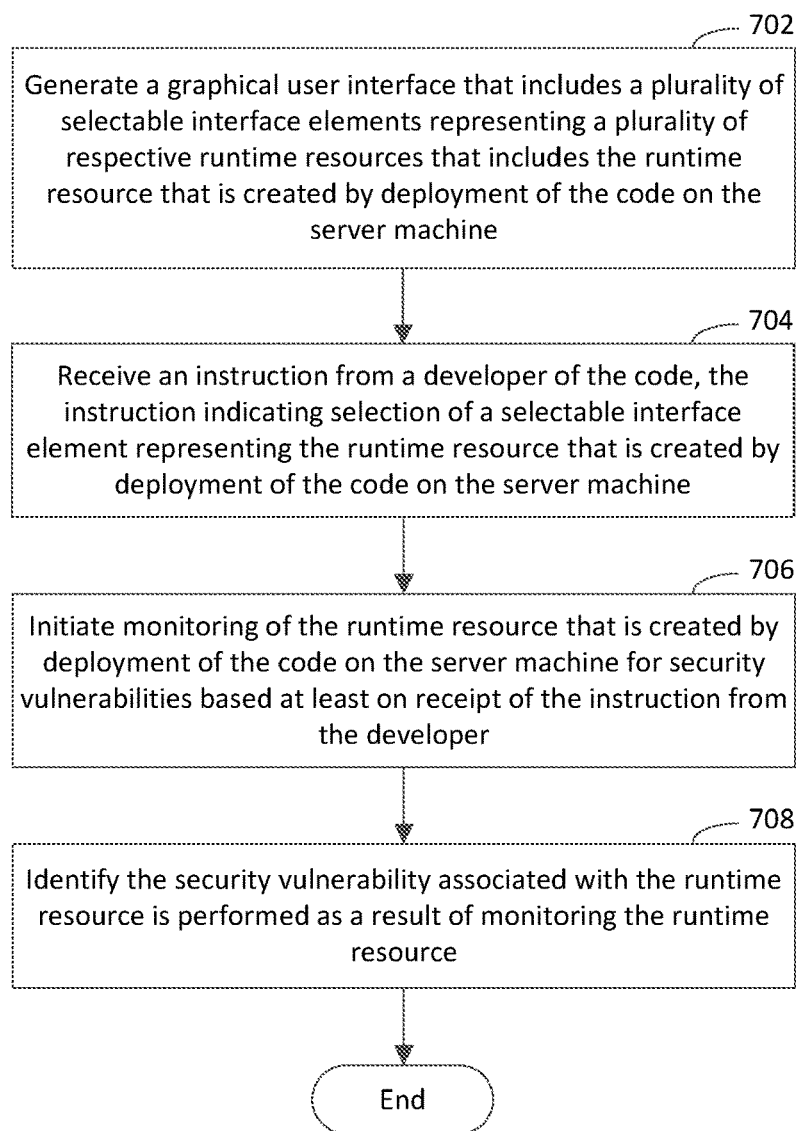

702

Generate a graphical user interface that includes a plurality of selectable interface elements representing a plurality of respective runtime resources that includes the runtime resource that is created by deployment of the code on the server machine

704

Receive an instruction from a developer of the code, the instruction indicating selection of a selectable interface element representing the runtime resource that is created by deployment of the code on the server machine

706

Initiate monitoring of the runtime resource that is created by deployment of the code on the server machine for security vulnerabilities based at least on receipt of the instruction from the developer

708

Identify the security vulnerability associated with the runtime resource is performed as a result of monitoring the runtime resource End

FIG. 7

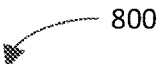

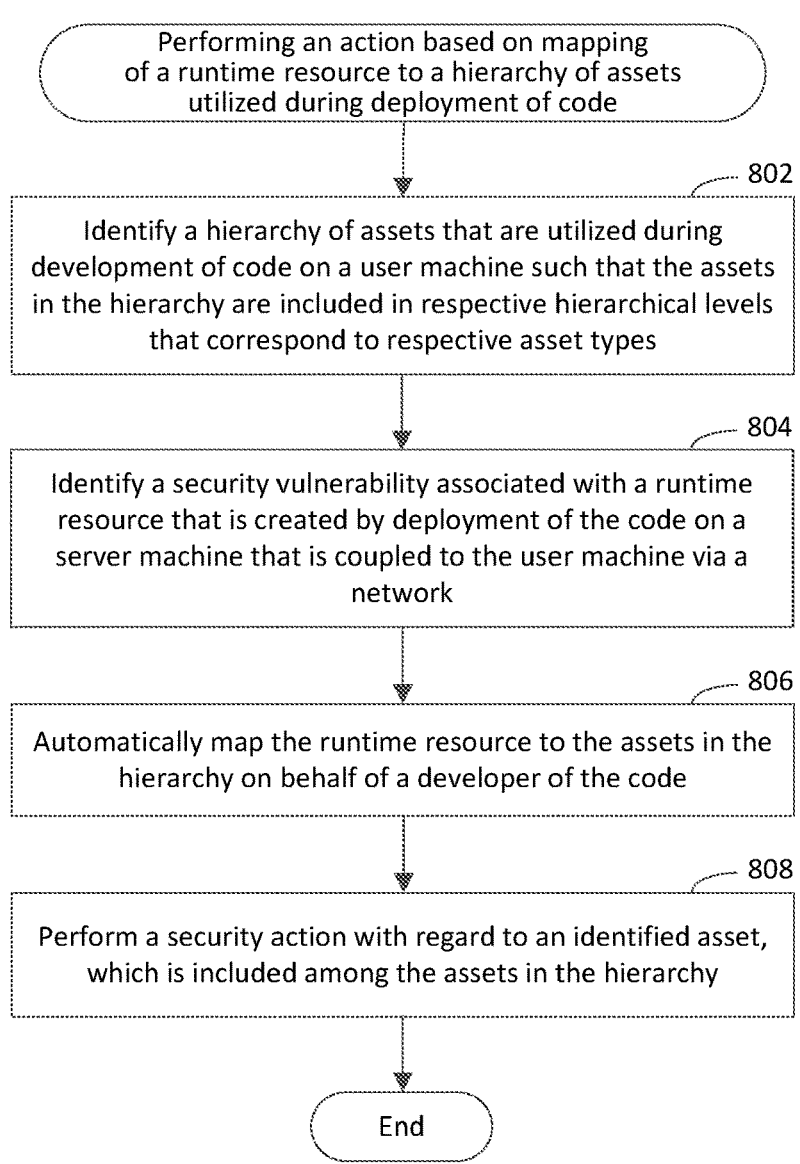

800

Performing an action based on mapping
of a runtime resource to a hierarchy of assets
utilized during deployment of code

802

Identify a hierarchy of assets that are utilized during
development of code on a user machine such that the assets
in the hierarchy are included in respective hierarchical levels
that correspond to respective asset types

804

Identify a security vulnerability associated with a runtime
resource that is created by deployment of the code on a
server machine that is coupled to the user machine via a
network

806

Automatically map the runtime resource to the assets in the
hierarchy on behalf of a developer of the code

808

Perform a security action with regard to an identified asset,
which is included among the assets in the hierarchy End

```
script: |
  first=$(docker images --format "{{.ID}}" | head -n 1)
  echo "##vso[task.setvariable variable=firstDocker;isreadonly=true]$first"
  echo "##vso[task.setvariable variable=pipelineStartTime;isreadonly=true]$SYSTEM_PIPELINESTARTTIME"
```

```
script: |
  echo "Pipeline Start: $(pipelineStartTime)"
  docker images --filter "since-$(firstDocker)" --format "table {{.CreateAt}} {{.Repository}} {{.Digest}}"
```

Figures 12, 13:
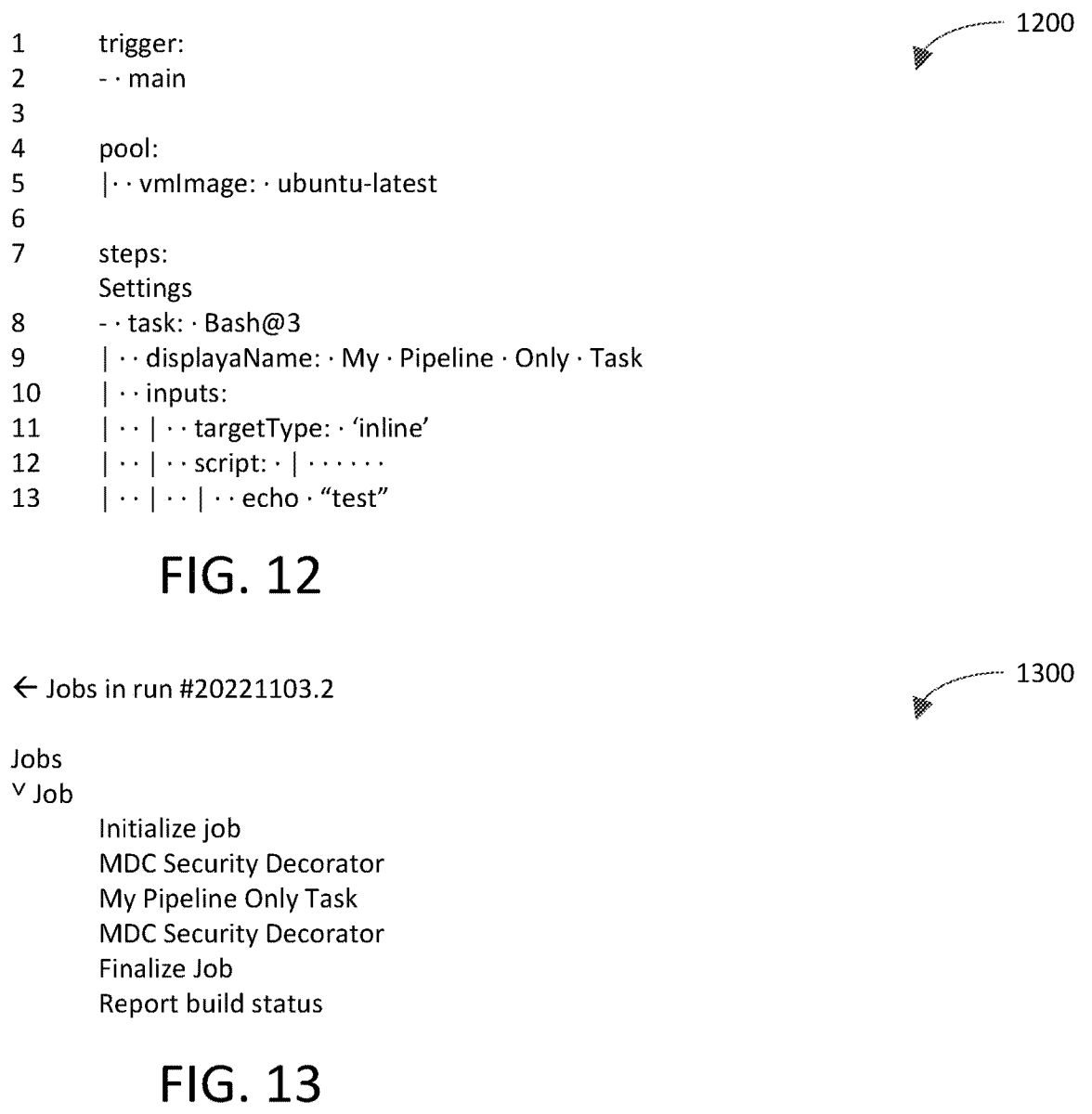

```
1   trigger:
2   - · main
3
4   pool:
5   |··vmImage:··ubuntu-latest
6
7   steps:
    Settings
8   -·task:·Bash@3
9   |···displayaName:··My·Pipeline·Only·Task
10  |··inputs:
11  |···|···targetType:·'inline'
12  |···|···script:·|·······
13  |···|···|··echo·"test"
```

← Jobs in run #20221103.2

Jobs
∨ Job

Initialize job
MDC Security Decorator
My Pipeline Only Task
MDC Security Decorator
Finalize Job
Report build status

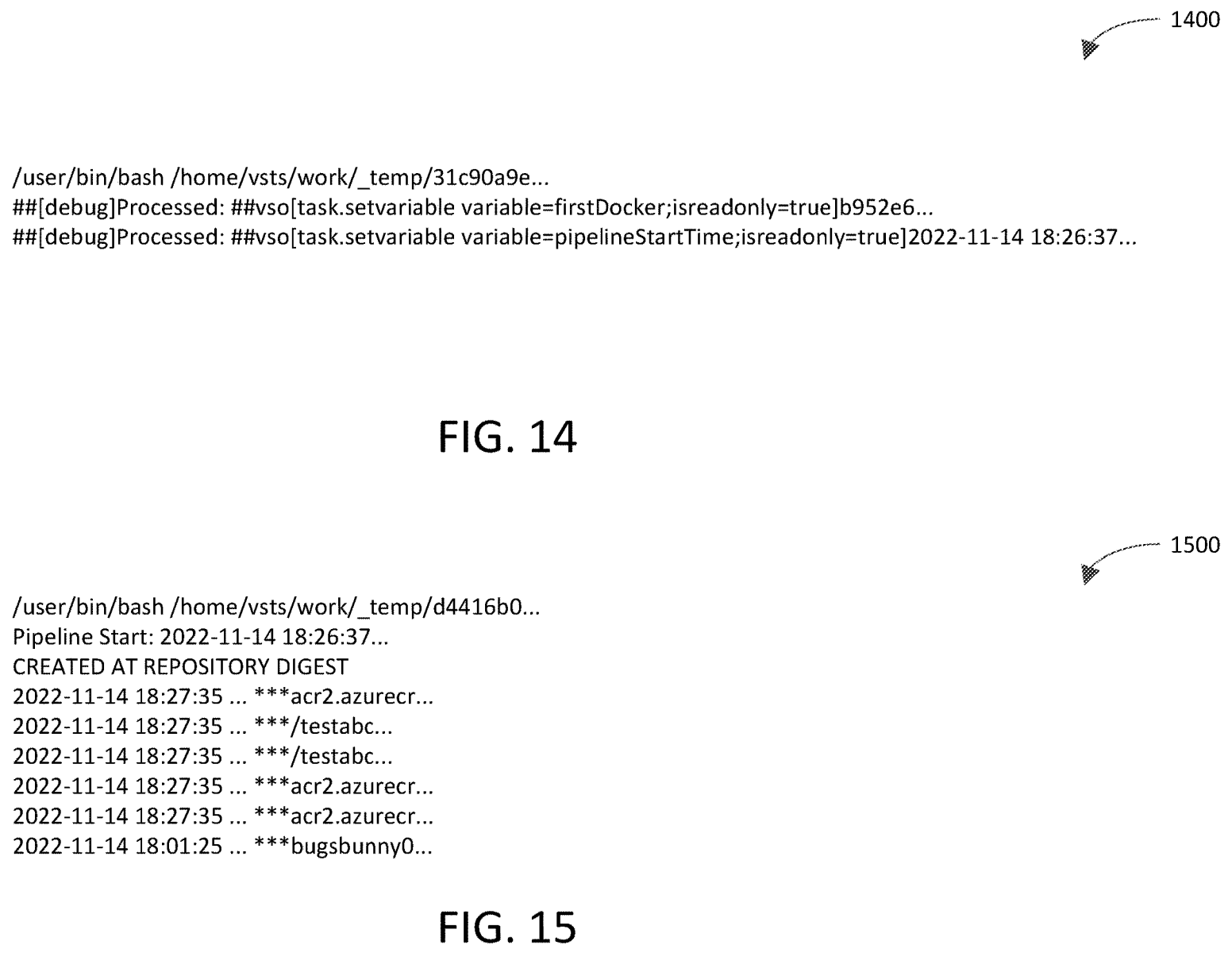

/user/bin/bash /home/vsts/work/_temp/31c90a9e...
[debug]Processed: ##tvso[task.setvariable variable=firstDocker;isreadonly=true]b952e6...
[debug]Processed: ##tvso[task.setvariable variable=pipelineStartTime;isreadonly=true]2022-11-14 18:26:37...

/user/bin/bash /home/vsts/work/_temp/d4416b0...
Pipeline Start: 2022-11-14 18:26:37...
CREATED AT REPOSITORY DIGEST
2022-11-14 18:27:35 ... ***acr2.azurecr...
2022-11-14 18:27:35 ... ***/testabc...
2022-11-14 18:27:35 ... ***/testabc...
2022-11-14 18:27:35 ... ***acr2.azurecr...
2022-11-14 18:27:35 ... ***acr2.azurecr...
2022-11-14 18:01:25 ... ***bugsbunny0...

FIG. 15

PERFORMING ACTION BASED ON MAPPING OF RUNTIME RESOURCE TO HIERARCHY OF ASSETS UTILIZED DURING DEVELOPMENT OF CODE

BACKGROUND

Deployment of a computer program creates runtime resources, which may be targeted by malicious entities. For instance, when the computer program is deployed in the cloud, such malicious entities may launch a cyberattack against the runtime resources. Thus, the runtime resources often are analyzed to identify security vulnerabilities in the runtime resources. An endpoint detection and response (EDR) program is an example of a computer program that may be utilized to analyze the runtime resources. An EDR program is a computer program that is configured to monitor an entity to detect, mitigate, or block a cyber threat. A cyber threat is a malicious act that is configured (e.g., intended) to steal or damage data or to interfere with operation of an entity, such as a computing system or an enterprise. The EDR program may generate alerts or recommendations regarding security vulnerabilities that are identified in the runtime resources. Security administrators or workload owners typically discuss the alerts or recommendations with developers of the computer program to determine an appropriate plan to address the security vulnerabilities.

SUMMARY

Assets are utilized during development of code, and a runtime resource is created from the assets during deployment of the code. The assets are arranged in a hierarchy. It may be desirable to automatically identify the hierarchy and to map the runtime resource to the assets in the hierarchy (e.g., to a particular asset in the hierarchy). For example, by automatically identifying the hierarchy and mapping the runtime resource to the assets in the hierarchy, a source of an issue (e.g., a security vulnerability) in the runtime resource may be addressed by identifying and remedying a source of the issue in the hierarchy of assets. Accordingly, automatically identifying the hierarchy and mapping the runtime resource to the assets in the hierarchy may increase security of a computing system on which the runtime resource is deployed.

Various approaches are described herein for, among other things, performing an action based on (e.g., based at least on) mapping of a runtime resource to a hierarchy of assets utilized during development of code. Examples of an asset that may be utilized during development of code include but are not limited to a build of the code, a line of the code, a pipeline (e.g., build pipeline, deployment pipeline, release pipeline, test pipeline), a repository (e.g., code repository), a GitHub action, a file (e.g., source code file), a template (e.g., infrastructure-as-code template), a workflow, a branch of the code, and a project.

A hierarchy of assets includes multiple hierarchical levels among which the assets are arranged. Each hierarchical level in the hierarchy corresponds to a respective asset type. For instance, each hierarchical level may be restricted to include only assets of a particular (e.g., pre-defined) asset type. Examples of an asset type include but are not limited to a build of code, a line of code, a pipeline, a repository, a GitHub action, a file, a template, a workflow, a branch of code, and a project.

Each hierarchical level in the hierarchy includes one or more of the assets. For example, a first (e.g., highest) hierarchical level may include (e.g., consist of) one or more builds of code; a second hierarchical level may include one or more repositories; a third hierarchical level may include one or more projects; a fourth hierarchical level may include one or more pipelines; a fifth hierarchical level may include one or more branches of code; a sixth hierarchical level may include one or more lines of code, and so on. The first hierarchical level is relatively higher than other hierarchical levels (e.g., the second hierarchical level, the third hierarchical level, and so on) in the hierarchy. The second hierarchical level is relatively lower than the first hierarchical level and relatively higher than the other hierarchical levels (e.g., the third hierarchical level, the fourth hierarchical level, and so on) in the hierarchy. The third hierarchical level is relatively lower than the first hierarchical level and the second hierarchical level and is relatively higher than the other hierarchical levels (e.g., the fourth hierarchical level, the fifth hierarchical level, and so on) in the hierarchy.

Asset(s) in a relatively higher hierarchical level of the hierarchy may be said to include asset(s) in a relatively lower hierarchical level of the hierarchy. For example, a repository in a first (e.g., highest) hierarchical level may include a file, which is in a second hierarchical level that is lower in the hierarchy than the first hierarchical level. In accordance with this example, the file may include a line of code, which is in a third (e.g., lowest) hierarchal level that is lower in the hierarchy than the second hierarchical level. Examples of a runtime resource include but are not limited to a storage account, a virtual machine, a function, a container image, a container registry, and a web application.

In a first example approach, a hierarchy of assets that are utilized during development of code on a user machine is automatically identified. The assets in the hierarchy are included in respective hierarchical levels that correspond to respective asset types. A first asset in a relatively higher hierarchical level of the hierarchy includes a second asset in a relatively lower hierarchical level of the hierarchy. A runtime resource, which is created by deployment of the code on a server machine that is coupled to the user machine via a network, is mapped to the assets in the hierarchy based at least on (e.g., in response to or as a result of) the assets being utilized during development of the code and further based at least on the runtime resource being created by the deployment of the code. An action is performed with regard to an identified asset, which is included among the assets in the hierarchy, based at least on the runtime resource being mapped to the identified asset.

In a second example approach, a hierarchy of assets that are utilized during development of code on a user machine is identified (e.g., automatically identified). The assets in the hierarchy are included in respective hierarchical levels that correspond to respective asset types. A first asset in a relatively higher hierarchical level of the hierarchy includes a second asset in a relatively lower hierarchical level of the hierarchy. A security vulnerability associated with a runtime resource, which is created by deployment of the code on a server machine that is coupled to the user machine via a network, is identified. The runtime resource is automatically mapped to the assets in the hierarchy on behalf of a developer of the code. A security action is performed with regard to an identified asset, which is included among the assets in the hierarchy, based at least on the security vulnerability being identified and further based at least on the runtime resource being automatically mapped to the identified asset on behalf of the developer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 2-8 depict flowcharts of example methods for performing an action based on mapping of a runtime resource to a hierarchy of assets utilized during development of code in accordance with embodiments.

FIG. 10 depicts an example start script in accordance with an embodiment.

FIG. 11 depicts an example end script in accordance with an embodiment.

FIG. 12 depicts an example pipeline in which an extension is automatically added in accordance with an embodiment.

FIG. 13 depicts a job in which decorators are automatically added in accordance with an embodiment.

FIG. 14 depicts example output of a start script in accordance with an embodiment.

FIG. 15 depicts example output of an end script for a job that built and pushed an image in accordance with an embodiment.

Figure 1:
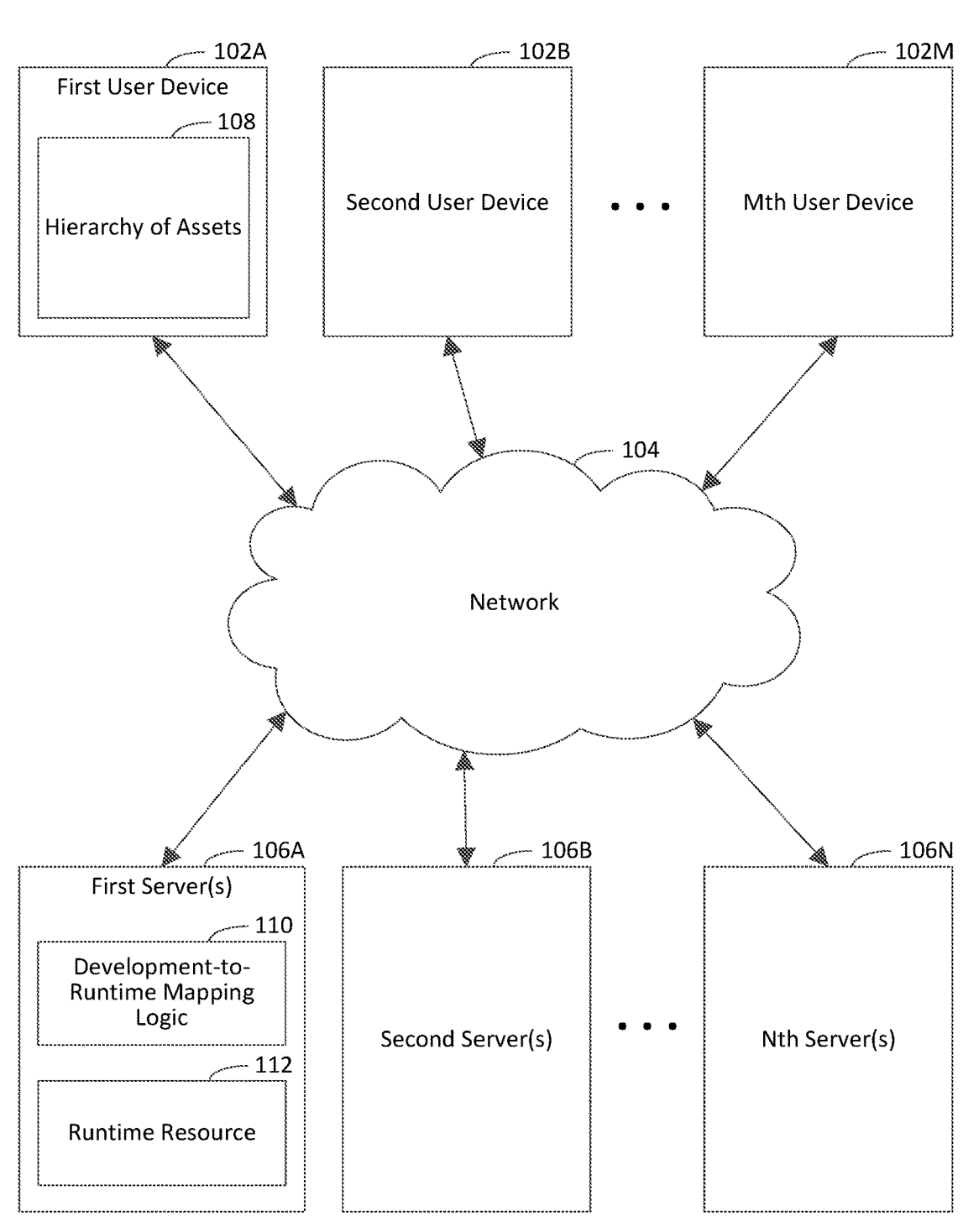
FIG. 1 is a block diagram of an example development-to-runtime mapping system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

Assets are utilized during development of code, and a runtime resource is created from the assets during deployment of the code. The assets are arranged in a hierarchy. It may be desirable to automatically identify the hierarchy and to map the runtime resource to the assets in the hierarchy (e.g., to a particular asset in the hierarchy). For example, by automatically identifying the hierarchy and mapping the runtime resource to the assets in the hierarchy, a source of an issue (e.g., a security vulnerability) in the runtime resource may be addressed by identifying and remedying a source of the issue in the hierarchy of assets. Accordingly, automatically identifying the hierarchy and mapping the runtime resource to the assets in the hierarchy may increase security of a computing system on which the runtime resource is deployed.

Example embodiments described herein are capable of performing an action based on (e.g., based at least on) mapping of a runtime resource to a hierarchy of assets utilized during development of code. Examples of an asset that may be utilized during development of code include but are not limited to a build of the code, a line of the code, a pipeline (e.g., build pipeline, deployment pipeline, release pipeline, test pipeline), a repository (e.g., code repository), a GitHub action, a file (e.g., source code file), a template (e.g., infrastructure-as-code template), a workflow, a branch of the code, and a project.

A hierarchy of assets includes multiple hierarchical levels among which the assets are arranged. Each hierarchical level in the hierarchy corresponds to a respective asset type. For instance, each hierarchical level may be restricted to include only assets of a particular (e.g., pre-defined) asset type. Examples of an asset type include but are not limited to a build of code, a line of code, a pipeline, a repository, a GitHub action, a file, a template, a workflow, a branch of code, and a project.

Each hierarchical level in the hierarchy includes one or more of the assets. For example, a first (e.g., highest) hierarchical level may include (e.g., consist of) one or more builds of code; a second hierarchical level may include one or more repositories; a third hierarchical level may include one or more projects; a fourth hierarchical level may include one or more pipelines; a fifth hierarchical level may include one or more branches of code; a sixth hierarchical level may include one or more lines of code, and so on. The first hierarchical level is relatively higher than other hierarchical levels (e.g., the second hierarchical level, the third hierarchical level, and so on) in the hierarchy. The second hierarchical level is relatively lower than the first hierarchical level and relatively higher than the other hierarchical levels (e.g., the third hierarchical level, the fourth hierarchical level, and so on) in the hierarchy. The third hierarchical level is relatively lower than the first hierarchical level and the second hierarchical level and is relatively higher than the other hierarchical levels (e.g., the fourth hierarchical level, the fifth hierarchical level, and so on) in the hierarchy.

Asset(s) in a relatively higher hierarchical level of the hierarchy may be said to include asset(s) in a relatively lower hierarchical level of the hierarchy. For example, a repository in a first (e.g., highest) hierarchical level may include a file, which is in a second hierarchical level that is lower in the hierarchy than the first hierarchical level. In accordance with this example, the file may include a line of code, which is in a third (e.g., lowest) hierarchal level that is lower in the hierarchy than the second hierarchical level. Examples of a runtime resource include but are not limited to a storage account, a virtual machine, a function, a container image, a container registry, and a web application.

Example techniques described herein have a variety of benefits as compared to conventional techniques for correlating assets and runtime resources. For instance, the example techniques are capable of bridging the gap between scanning for issues at runtime and scanning for issues during development. By automatically identifying a hierarchy of assets that is utilized during development of code and mapping a runtime resource that is created from the assets to the assets in the hierarchy, issues regarding the runtime resource may be addressed (e.g., resolved) more efficiently and more quickly, thereby increasing security of the runtime resource. For instance, based on the mapping, policies may be established with regard to one or more of the assets in the hierarchy to address such issues in early stages of the supply chain (e.g., prior to execution of the code), and a visualization of the mapping may be provided to a developer of the code. The example techniques may be cloud platform-agnostic and/or build platform-agnostic. For instance, a unique identifier (e.g., a container image digest) may be used across arbitrary cloud platforms and/or arbitrary build platforms to map the runtime resource to assets that are utilized during development The example techniques are capable of automating identification of a hierarchy of assets that are utilized during development of code. Some example techniques are capable of automating mapping of a runtime resource, which is deployed from the assets in the hierarchy, to those assets. Accordingly, the amount of time that is consumed to identify the hierarchy of assets and/or to map the runtime resource to the assets in the hierarchy may be reduced. A user experience of an information technology (IT) professional who is tasked with managing security of the runtime resource may be increased, for example, by obviating a need for the IT professional to perform operations manually to identify the hierarchy of assets and/or to map the runtime resource to the assets in the hierarchy. For instance, the example techniques may obviate a need for the IT professional to manually determine a source of an issue associated with the runtime resource by tracing the source back to an asset in the hierarchy. By eliminating a need for the IT professional to manually identify the hierarchy of assets, manually map the runtime resource to the assets in the hierarchy, and/or manually determine a source of an issue associated with the runtime resource, a cost of identifying the hierarchy of assets, mapping the runtime resource to the assets, and/or determining the source of the issue may be reduced. For instance, time spent by an IT professional to perform such operations manually has an associated cost. By eliminating the manual operations, the cost of performing the operations can be reduced by the labor cost associated with the IT professional performing the manual operations.

The example techniques may reduce an amount of time and/or resources (e.g., processor cycles, memory, network bandwidth) that is consumed to identify a hierarchy of assets that are utilized during deployment of code, to correlate a runtime resource that is deployed from the assets with those assets in the hierarchy, and/or to determine a source of an issue associated with the runtime resource. For instance, by automatically identifying the hierarchy of assets, automatically mapping the runtime resource to the assets, and/or automatically determining a source of an issue associated with the runtime resource, the time and/or resources that would have been consumed by an IT professional to perform such operations manually is reduced (e.g., avoided). By reducing the amount of time and/or resources that is consumed by a computing system to identify the hierarchy of assets, to map the runtime resource to the assets, and/or to determine a source of an issue associated with the runtime resource, the efficiency of the computing system may be increased.

FIG. 1 is a block diagram of an example development-to-runtime mapping system 100 in accordance with an embodiment. Generally speaking, the development-to-runtime mapping system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the development-to-runtime mapping system 100 performs an action based on (e.g., based at least on) mapping of a runtime resource to a hierarchy of assets utilized during development of code. Detail regarding techniques for performing an action based on mapping of a runtime resource to a hierarchy of assets utilized during development of code is provided in the following discussion.

As shown in FIG. 1, the development-to-runtime mapping system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The first user device 102A is shown to include a hierarchy of assets 108 (a.k.a. hierarchy 108) for illustrative purposes. The assets in the hierarchy 108 are utilized during development of code. In a developer example, a developer who has access to the first user device 102A may create the hierarchy of assets 108 while developing the code. The hierarchy of assets 108 is shown to be included in (e.g., hosted by) the first user device 102A for illustrative purposes and is not intended to be limiting. It will be recognized that the hierarchy of assets 108 may be included in any of the user devices 102A-102M.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the development-to-runtime mapping system 100.

One example type of computer program that may be executed by one or more of the servers 106A-106N is an endpoint detection and response (EDR) program. An EDR program is a computer program that is configured to monitor an entity to detect, mitigate, or block a cyber threat. A cyber threat is a malicious act that is configured (e.g., intended) to steal or damage data or to interfere with operation of an entity, such as a computing system or an enterprise. It will be recognized that an EDR program or at least a portion thereof may be executed by any one or more of the user devices 102A-102M. Examples of an EDR program include but are not limited to Microsoft Defender® developed and distributed by Microsoft Corporation, Cortex XDR® developed and distributed by Palo Alto Networks, Inc., Crowd-Strike Falcon® developed and distributed by CrowdStrike Holdings, Inc., Cynet 360 AutoXDR™ developed and distributed by Cynet Security Ltd., SentinelOne® developed and distributed by SentinelOne, Inc., Symantec Endpoint Protection™ developed and distributed by Broadcom, Inc., and Trend Micro One™ developed and distributed by Trend Micro Inc. It will be recognized that the example techniques described herein may be implemented using an EDR program. For instance, a software product (e.g., a subscription service, a non-subscription service, or a combination thereof) may include the EDR program, and the software product may be configured to perform the example techniques, though the scope of the example embodiments is not limited in this respect.

The first server(s) 106A are shown to include development-to-runtime mapping logic 110 and a runtime resource 112 for illustrative purposes. The development-to-runtime mapping logic 110 is configured to perform an action based on (e.g., based at least on) mapping of the runtime resource 112 to the hierarchy of assets 108. The runtime resource 112 is created by deployment of the code on the first server(s) 106A. In accordance with the developer example mentioned above, the developer who creates the hierarchy of assets 108 while developing the code may trigger the deployment of the code on the first server(s) 106A. In further accordance with the developer example, triggering the deployment of the code by the developer may cause the runtime resource 112 to be created on the first server(s) 106A.

In a first example implementation, the development-to-runtime mapping logic 110 automatically identifies the hierarchy of assets 108 on the first user device 102A. The assets in the hierarchy 108 are included in respective hierarchical levels that correspond to respective asset types. A first asset in a relatively higher hierarchical level of the hierarchy 108 includes a second asset in a relatively lower hierarchical level of the hierarchy 108. The development-to-runtime mapping logic 110 maps the runtime resource 112 to the assets in the hierarchy 108 based at least on (e.g., in response to or as a result of) the assets being utilized during development of the code and further based at least on the runtime resource 112 being created by the deployment of the code. The development-to-runtime mapping logic 110 performs an action with regard to an identified asset, which is included among the assets in the hierarchy 108, based at least on the runtime resource 112 being mapped to the identified asset in the hierarchy 108.

In a second example implementation, the development-to-runtime mapping logic 110 identifies (e.g., automatically identifies) the hierarchy of assets 108 on the first user device 102A. The assets in the hierarchy 108 are included in respective hierarchical levels that correspond to respective asset types. A first asset in a relatively higher hierarchical level of the hierarchy 108 includes a second asset in a relatively lower hierarchical level of the hierarchy 108. The development-to-runtime mapping logic 110 identifies a security vulnerability associated with the runtime resource 112. The development-to-runtime mapping logic 110 automatically maps the runtime resource 112 to the assets in the hierarchy 108 on behalf of a developer of the code. The development-to-runtime mapping logic 110 performs a security action with regard to an identified asset, which is included among the assets in the hierarchy 108, based at least on the security vulnerability being identified and further based at least on the runtime resource 112 being automatically mapped to the identified asset in the hierarchy 108 on behalf of the developer.

The development-to-runtime mapping logic 110 may be implemented in various ways to perform an action based on mapping of the runtime resource 112 to the hierarchy of assets 108, including being implemented in hardware, software, firmware, or any combination thereof. For example, the development-to-runtime mapping logic 110 may be implemented as computer program code configured to be executed in one or more processors. In another example, at least a portion of the development-to-runtime mapping logic 110 may be implemented as hardware logic/electrical circuitry. For instance, at least a portion of the development-to-runtime mapping logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the development-to-runtime mapping logic 110 may be (or may be included in) an EDR program, though the scope of the example embodiments is not limited in this respect.

The development-to-runtime mapping logic 110 is shown to be incorporated in the first server(s) 106A for illustrative purposes and is not intended to be limiting. It will be recognized that the development-to-runtime mapping logic 110 (or any portion(s) thereof) may be incorporated in any one or more of the servers 106A-106N, any one or more of the user devices 102A-102M, or any combination thereof. For example, client-side aspects of the development-to-runtime mapping logic 110 may be incorporated in one or more of the user devices 102A-102M, and server-side aspects of development-to-runtime mapping logic 110 may be incorporated in one or more of the servers 106A-106N.

FIGS. 2-8 depict flowcharts 200, 300, 400, 500, 600, 700, and 800 of example methods for performing an action based on mapping of a runtime resource to a hierarchy of assets utilized during development of code in accordance with embodiments. Flowcharts 200, 300, 400, 500, 600, 700, and 800 may be performed by the first server(s) 106A shown in FIG. 1, for example. For illustrative purposes, flowcharts

Figure 9:
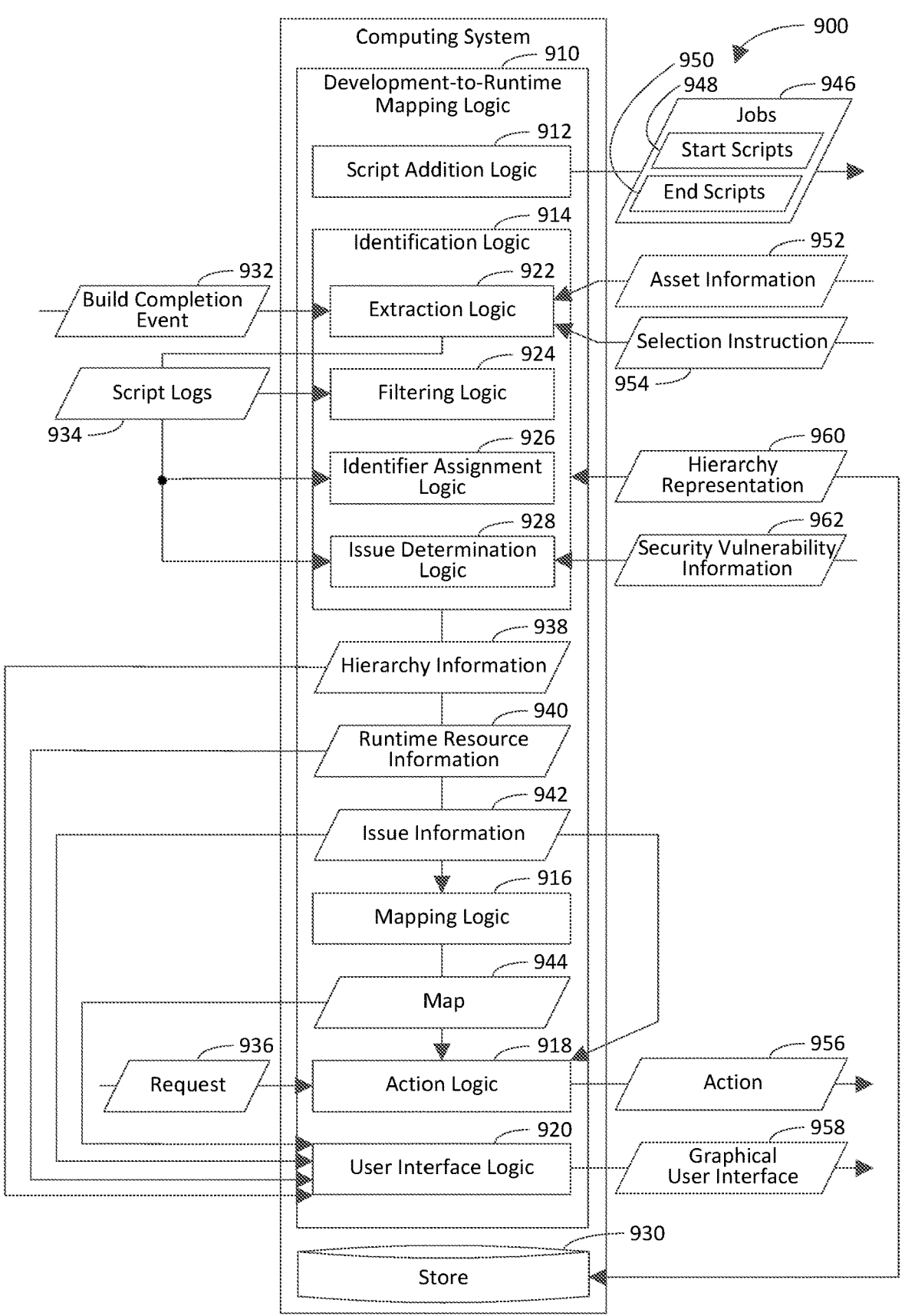
FIG. 9 is a block diagram of an example computing system in accordance with an embodiment.

200, 300, 400, 500, 600, 700, and 800 are described with respect to computing system 900 shown in FIG. 9, which is an example implementation of the first server(s) 106A. As shown in FIG. 9, the computing system 900 includes development-to-runtime mapping logic 910 and a store 930. The development-to-runtime mapping logic 910 includes script addition logic 912, identification logic 914, mapping logic 916, action logic 918, and user interface logic 920. The identification logic 914 includes extraction logic 922, filtering logic 924, identifier assignment logic 926, and issue determination logic 928. The store 930 may be any suitable type of store. One type of store is a database. For instance, the store 930 may be a relational database, an entity-relationship database, an object database, an object relational database, an extensible markup language (XML) database, etc. Further structural and operational embodiments will be apparent to persons skilled in the relevant art(s) based on the discussion regarding flowcharts 200, 300, 400, 500, 600, 700, and 800.

As shown in FIG. 2, the method of flowchart 200 begins at step 202. In step 202, a hierarchy of assets that are utilized during development of code on a user machine is automatically identified. The assets in the hierarchy are included in respective hierarchical levels that correspond to respective asset types. A first asset in a relatively higher hierarchical level of the hierarchy includes a second asset in a relatively lower hierarchical level of the hierarchy. In an example implementation, the identification logic 914 automatically identifies the hierarchy of assets. For instance, the identification logic 914 may review asset information 952, which identifies the hierarchy of assets. The asset information 952 may identify each of the assets in the hierarchy and may indicate relationships between the assets. For example, the asset information 952 may indicate that the assets include a first asset, which includes a second asset, which includes a third asset, and so on. The identification logic 914 may identify the hierarchy based on the assets identified by the asset information 952 and the relationships therebetween indicated by the asset information 952. The identification logic 914 generates hierarchy information 938 to indicate the hierarchy. For example, the hierarchy information 938 may indicate each of the assets in the hierarchy and an arrangement of the assets in the hierarchy. In accordance with this example, the hierarchy information 938 may indicate that the hierarchy includes a first asset, which includes a second asset, which includes a third asset, and so on.

At step 204, a runtime resource, which is created by deployment of the code on a server machine that is coupled to the user machine via a network, is mapped to the assets in the hierarchy based at least on the assets being utilized during development of the code and further based at least on the runtime resource being created by the deployment of the code. For instance, the runtime resource may be mapped to the assets in the hierarchy on behalf of a developer of the code (e.g., without assistance from the developer). In an example implementation, the mapping logic 916 maps the runtime resource to the assets in the hierarchy. For instance, the identification logic 914 may generate runtime resource information 940 to indicate the runtime resource that is created by the deployment of the code, and the mapping logic 916 may analyze the runtime resource information 940 to identify the runtime resource. The mapping logic 916 may analyze the hierarchy information 938 to determine the hierarchy of assets. In an aspect, the runtime resource information 940 includes a reference to at least one of the assets in the hierarchy. In accordance with this aspect, the mapping logic 916 maps the runtime resource to the assets in the hierarchy by comparing the asset(s) referenced by the runtime resource information 940 to the assets of the hierarchy, as indicated by the hierarchy information 938. The mapping logic 916 generates a map 944 to indicate the mapping of the runtime resource to the assets in the hierarchy.

At step 206, an action is performed with regard to an identified asset, which is included among the assets in the hierarchy, based at least on the runtime resource being mapped to the identified asset. In an example implementation, the action logic performs an action 956 with regard to the identified asset. For example, the action logic 918 may analyze the map 944 to determine that the runtime resource is mapped to the identified asset.

In an example embodiment, mapping the runtime resource at step 204 is performed automatically. For instance, the mapping may be performed without a need for a user (e.g., a developer of the code) to analyze a build of the code or to modify the assets or a subset thereof (e.g., to include respective manually generated identifiers). By automatically mapping the runtime resource, the identifiers that identify the respective assets in the hierarchy may be automatically generated on behalf of the user. In accordance with this embodiment, the action is performed with regard to the identified asset at step 206 based at least on the runtime resource being automatically mapped to the identified asset.

In another example embodiment, mapping the runtime resource at step 204 includes mapping a container image, which includes the code and additional code that enables the code to run, to the assets in the hierarchy based at least on the assets being utilized during development of the code and further based at least on the container image being created by the deployment of the code. In accordance with this embodiment, the action is performed with regard to the identified asset at step 206 based at least on the container image being mapped to the identified asset.

In yet another example embodiment, the action is performed at step 206 with regard to a repository from which the code is deployed based at least on the runtime resource being mapped to the repository. In accordance with this embodiment, the assets in the hierarchy include the repository.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes adding start scripts to a beginning of respective jobs in a build of the code and end scripts to an end of the respective jobs. The start scripts are configured to query a daemon for first information regarding assets that are built prior to performance of the respective jobs. The end scripts are configured to query the daemon for second information regarding assets that are built and pushed by the respective jobs and third information regarding assets that are pulled during the build of the code. The second information indicates the hierarchy of the assets. In an example implementation, the script addition logic 912 adds start scripts 948 to a beginning of respective jobs 946 in a build of the code and end scripts 950 to an end of the respective jobs 946. The start scripts 948 query the daemon for the first information regarding assets that are built prior to performance of the respective jobs 946. The end scripts 950 query the daemon for the second information regarding assets that are built and pushed by the respective jobs 946 and the third information regarding assets that are pulled during the build of the code. In accordance with this embodiment, automatically identifying the hierarchy of the assets at step 202 is performed by reviewing the second information.

In an aspect of this embodiment, automatically identifying the hierarchy of the assets at step 202 further includes triggering extraction of logs associated with the end scripts based at least on a build completion event, which indicates completion of the build of the code. A first subset of the logs includes the second information. A second subset of the logs includes the third information. In an example implementation, the extraction logic 922 triggers extraction of script logs 934 associated with the end scripts 950 from the asset information 952 based at least on receipt of a build completion event 932, which is generated as a result of the build of the code being completed. In accordance with this aspect, automatically identifying the hierarchy of the assets at step 202 further includes filtering the logs to obtain the first subset of the logs, which includes the second information, and to disregard the second subset of the logs, which includes the third information. In an example implementation, the filtering logic 924 filters the script logs 934 to obtain the first subset of the logs and to disregard the second subset of the logs.

In another example embodiment, the method of flowchart 200 further includes generating a graphical user interface that includes a first interface element and a second interface element. The first interface element represents the runtime resource. The second interface element represents the identified asset. In an example implementation, user interface logic 920 generates a graphical user interface 958 that includes the first interface element and the second interface element. For example, the user interface logic 920 may analyze the map 944 to identify the runtime resource and the identified asset. In accordance with this example, the user interface logic 920 may generate the graphical user interface 958 based on identification of the runtime resource and the identified asset in the map 944. In accordance with this embodiment, an arrangement of the first interface element and the second interface element in the graphical user interface indicates a relationship between the runtime resource and the identified asset. For instance, the arrangement may indicate that the runtime resource was created by deploying the identified asset.

In yet another example embodiment, the method of flowchart 200 further includes determining an issue regarding the runtime resource. In an example implementation, the issue determination logic 928 determines the issue regarding the runtime resource. The issue determination logic 928 generates issue information 942 to indicate the issue. For instance, the issue information 942 may identify the runtime resource and indicate that the issue pertains to the runtime resource. In accordance with this embodiment, performing the action at step 206 includes changing a configuration of the identified asset, which is included among the assets in the hierarchy, based at least on the runtime resource being mapped to the identified asset and further based at least on the issue regarding the runtime resource being determined. For instance, the action logic 918 may analyze the map 944 to determine that the runtime resource is mapped to the identified asset. The action logic 918 may analyze the issue information 942 to determine that the runtime resource has the issue.

In still another example embodiment, the method of flowchart 200 includes one or more of the steps shown in flowchart 300 of FIG. 3. As shown in FIG. 3, the method of flowchart 300 begins at step 302. In step 302, a unique identifier is assigned to the runtime resource. In an example implementation, the identifier assignment logic 926 assigns the unique identifier to the runtime resource. The identification logic 914 may configure the runtime resource information 940 to indicate the unique identifier that is assigned to the runtime resource.

At step 304, a plurality of identifiers are assigned to the assets in the hierarchy. It should be noted that the plurality of identifiers includes the identifier assigned to the identified asset. In an example implementation, the identifier assignment logic 926 assigns the plurality of identifiers to the respective assets in the hierarchy. The identification logic 914 may configure the hierarchy information 938 to indicate the plurality of identifiers that are assigned to the respective assets in the hierarchy.

At step 306, the unique identifier assigned to the runtime resource is mapped to the plurality of identifiers assigned to the assets in the hierarchy. In an example implementation, the mapping logic 916 maps the unique identifier assigned to the runtime resource to the plurality of identifiers assigned to the respective assets in the hierarchy. For instance, the mapping logic 916 may analyze the runtime resource information 940 to identify the unique identifier that is assigned to the runtime resource. The mapping logic 916 may analyze the hierarchy information 938 to identify the plurality of identifiers that are assigned to the respective assets in the hierarchy. The mapping logic 916 may generate the map 946 to indicate that the runtime resource is mapped to the assets in the hierarchy based on the unique identifier assigned to the runtime resource being mapped to the plurality of identifiers assigned to the respective assets in the hierarchy. Step 204 of flowchart 200 may include step 306, though the scope of the example embodiments is not limited in this respect.

At step 308, the action is performed with regard to the identified asset based at least on the unique identifier assigned to the runtime resource being mapped to an identifier assigned to the identified asset. In an example implementation, the action logic 918 performs the action 956 with regard to the identified asset based at least on the unique identifier assigned to the runtime resource being mapped to an identifier assigned to the identified asset. Step 206 of flowchart 200 may include step 308, though the scope of the example embodiments is not limited in this respect.

In another example embodiment, the method of flowchart 200 includes one or more of the steps shown in flowchart 400 of FIG. 4. As shown in FIG. 4, the method of flowchart 400 begins at step 402. In step 402, the hierarchy of the assets that are utilized during the development of the code is automatically identified by analyzing a build of the code. In an example implementation, the identification logic 914 automatically identifies the hierarchy of the assets that are utilized during the development of the code by analyzing a build of the code. Step 202 of flowchart 200 may include step 402, though the scope of the example embodiments is not limited in this respect.

At step 404, a representation of the hierarchy is stored in a store. In an example implementation, the identification logic 914 stores a hierarchy representation 960, which is the representation of the hierarchy, in the store 930.

At step 406, a representation of the identified asset is identified in the representation of the hierarchy that is stored in the store. In an example implementation, the identification logic 914 identifies the representation of the identified asset in the hierarchy representation 960, which is stored in the store 930. For instance, the identification logic 914 may generate the hierarchy information 938 based on the hierarchy representation 960 that is retrieved from the store 930.

At step 408, the action is performed with regard to the identified asset based at least on identification of the representation of the identified asset in the representation of the hierarchy that is stored in the store. In an example implementation, the action logic 918 performs the action with regard to the identified asset as a result of the representation of the identified asset being identified in the hierarchy representation 960, which is stored in the store 930.

In yet another example embodiment, the method of flowchart 200 includes one or more of the steps shown in flowchart 500 of FIG. 5. As shown in FIG. 5, the method of flowchart 500 begins at step 502. In step 502, a plurality of runtime resources, which are created by deployment of the code on the server machine, are mapped to the assets in the hierarchy based at least on the assets being utilized during development of the code and further based at least on the plurality of runtime resources being created by the deployment of the code. In an example implementation, the mapping logic 916 maps the plurality of runtime resources to the assets in the hierarchy. For instance, the identification logic 914 may configure the runtime resource information 940 to indicate the plurality of runtime resources that are created by the deployment of the code, and the mapping logic 916 may analyze the runtime resource information 940 to identify the plurality of runtime resources. The mapping logic 916 may analyze the hierarchy information 938 to determine the hierarchy of assets. In an aspect, the runtime resource information 940 includes a reference to at least one of the assets in the hierarchy. In accordance with this aspect, the mapping logic 916 maps the plurality of runtime resources to the assets in the hierarchy by comparing the asset(s) referenced by the runtime resource information 940 to the assets of the hierarchy, as indicated by the hierarchy information 938. The mapping logic 916 configures the map 944 to indicate the mapping of the plurality of runtime resources to the assets in the hierarchy. Step 204 of flowchart 200 may include step 502, though the scope of the example embodiments is not limited in this respect.

At step 504, a request for an indication of runtime resources that are associated with the identified asset is received. In an example implementation, the action logic 918 receives a request 936 for the indication of runtime resources that are associated with the identified asset.

At step 506, a message, which indicates the plurality of runtime resources, is generated in response to the request, based at least on the plurality of runtime resources being mapped to the identified asset. In an example implementation, the action logic 918 generates the message in response to the request 936. For instance, the action logic 918 may determine that the plurality of runtime resources are associated with the identified asset based on the map 944 mapping the plurality of runtime resources to the identified asset. In accordance with this implementation, the action 956 performed by the action logic 918 includes generating the message.

In still another example embodiment, the method of flowchart 200 includes one or more of the steps shown in flowchart 600 of FIG. 6. As shown in FIG. 6, the method of flowchart 600 begins at step 602. In step 602, a security vulnerability associated with the runtime resource is identified. In an example implementation, the identification logic 914 identifies the security vulnerability associated with the runtime resource. In accordance with this implementation, the identification logic 914 generates issue information 942 to indicate the runtime resource and to further indicate that the runtime resource has the security vulnerability.

At step 604, based at least on the runtime resource being mapped to the identified asset, the security vulnerability is mapped to the identified asset. In an example implementation, the mapping logic 944 maps the security vulnerability, as indicated by the issue information 942, to the identified asset based at least on the runtime resource being mapped to the identified asset. For instance, the mapping logic 916 may map the security vulnerability to the runtime resource based on the issue information 942 and map the runtime resource to the identified asset as described above with reference to step 204 shown in FIG. 2. The mapping logic 916 configures the map 944 to indicate that the security vulnerability is mapped to the identified asset.

At step 606, the security vulnerability is addressed by performing a remedial action with regard to the identified asset based at least on the security vulnerability being mapped to the identified asset. For instance, addressing the security vulnerability at step 606 may include mitigating (e.g., eliminating) the security vulnerability. In an example implementation, the action logic 918 addresses the security vulnerability by performing the remedial action with regard to the identified asset based at least on the map 944 indicating that the security vulnerability is mapped to the identified asset. For instance, receipt of the map 944 may trigger the action logic 918 to perform the remedial action. Step 206 of flowchart 200 may include step 606, though the scope of the example embodiments is not limited in this respect.

In an aspect of this embodiment, the method of flowchart 600 further includes receiving a request for information regarding security vulnerabilities associated with the identified asset. For example, the action logic 918 may receive a request 936 for the information regarding security vulnerabilities associated with the identified asset. In accordance with this aspect, performing the action at step 206 shown in FIG. 2 includes generating a message that indicates the security vulnerabilities, including the security vulnerability associated with the runtime resource as identified at step 602, in response to the request 936.

In another aspect of this embodiment, performing the remedial action at step 606 includes establishing an asset-specific policy that defines a rule to be enforced with regard to the identified asset. The asset-specific policy is specific to the identified asset. In one example, the asset-specific policy does not apply to assets other than the identified asset. In another example, the asset-specific policy does not apply to assets that are utilized during the development of the code, except for the identified asset. In yet another example, the rule specifies that if a number of security vulnerabilities that are mapped to the identified asset is greater than or equal to a threshold number, builds associated with the identified asset are not to be deployed. For instance, the builds may be blocked (e.g., prevented) from being deployed. In an example implementation, the action logic 918 establishes the asset-specific policy.

In yet another aspect of this embodiment, performing the remedial action at step 606 includes providing a notification to a developer of the code via a graphical user interface. In accordance with this aspect, the notification suggests an action to be initiated by the developer with regard to the identified asset to mitigate the security vulnerability.

In still another aspect of this embodiment, step 602 is replaced with one or more steps shown in flowchart 700 of FIG. 7. As shown in FIG. 7, the method of flowchart 700 begins at step 702. In step 702, a graphical user interface is generated that includes a plurality of selectable interface elements representing a plurality of respective runtime resources that includes the runtime resource that is created by deployment of the code on the server machine. The selectable interface elements are configured such that selection of the selectable interface elements initiates monitoring of the respective runtime resources for security vulnerabilities. In an example implementation, the user interface logic 920 generates a graphical user interface 958 that includes the plurality of selectable interface elements. For instance, the user interface logic 920 may analyze the runtime resource information 940 generated by the identification logic 914 to identify the plurality of runtime resources indicated therein.

At step 704, an instruction is received from a developer of the code. The instruction indicates selection of a selectable interface element representing the runtime resource that is created by deployment of the code on the server machine. In an example implementation, the extraction logic 922 receives a selection instruction 954 from the developer of the code. In accordance with this implementation, the selection instruction 954 indicates selection of the selectable interface element that represents the runtime resource created by deployment of the code.

At step 706, monitoring of the runtime resource, which is created by deployment of the code on the server machine, for security vulnerabilities is initiated based at least on receipt of the instruction from the developer. In an example implementation, the extraction logic 922 initiates monitoring of the runtime resource for security vulnerabilities based at least on receipt of the selection instruction 954.

At step 708, the security vulnerability associated with the runtime resource is identified as a result of monitoring the runtime resource. In an example implementation, the issue determination logic 928 identifies the security vulnerability as a result of the extraction logic 922 monitoring the runtime resource.

As shown in FIG. 8, the method of flowchart 800 begins at step 802. In step 802, a hierarchy of assets that are utilized during development of code on a user machine is identified (e.g., automatically identified). The assets in the hierarchy are included in respective hierarchical levels that correspond to respective asset types. A first asset in a relatively higher hierarchical level of the hierarchy includes a second asset in a relatively lower hierarchical level of the hierarchy. In an example implementation, the identification logic 914 identifies the hierarchy of assets. For instance, the identification logic 914 may review asset information 952, which identifies the hierarchy of assets. The asset information 952 may identify each of the assets in the hierarchy and may indicate relationships between the assets. For example, the asset information 952 may indicate that the assets include a first asset, which includes a second asset, which includes a third asset, and so on. The identification logic 914 may identify the hierarchy based on the assets identified by the asset information 952 and the relationships therebetween indicated by the asset information 952. The identification logic 914 generates hierarchy information 938 to indicate the hierarchy. For example, the hierarchy information 938 may indicate each of the assets in the hierarchy and an arrangement of the assets in the hierarchy. In accordance with this example, the hierarchy information 938 may indicate that the hierarchy includes a first asset, which includes a second asset, which includes a third asset, and so on.

In an example embodiment, the first asset in the relatively higher hierarchical level is a build of the code. In accordance with this embodiment, the second asset in the relatively lower hierarchical level is a line of the code.

At step 804, a security vulnerability, which is associated with a runtime resource that is created by deployment of the code on a server machine that is coupled to the user machine via a network, is identified. In an example implementation, the issue determination logic 928 identifies the security vulnerability associated with the runtime resource. For example, the issue determination logic 928 may identify the security vulnerability by analyzing security vulnerability information 962, which indicates the security vulnerability. In accordance with this example, the security vulnerability information 962 may be gathered by monitoring activity associated with the runtime resource. The activity may include operations performed by the runtime resource, operations performed on the runtime resource, attributes (e.g., permissions) associated with the runtime resource, and so on. The issue determination logic 928 generates issue information 942 to identify the runtime resource and to indicate that the runtime resource has the security vulnerability.

At step 806, the runtime resource is automatically mapped to the assets in the hierarchy on behalf of a developer of the code (e.g., without assistance from the developer). In an example implementation, the mapping logic 916 maps the runtime resource to the assets in the hierarchy on behalf of the developer. For instance, the identification logic 914 may generate runtime resource information 940 to indicate the runtime resource that is created by the deployment of the code, and the mapping logic 916 may analyze the runtime resource information 940 to identify the runtime resource. The mapping logic 916 may analyze the hierarchy information 938 to determine the hierarchy of assets. In an aspect, the runtime resource information 940 includes a reference to at least one of the assets in the hierarchy. In accordance with this aspect, the mapping logic 916 maps the runtime resource to the assets in the hierarchy by comparing the asset(s) referenced by the runtime resource information 940 to the assets of the hierarchy, as indicated by the hierarchy information 938. The mapping logic 916 generates a map 944 to indicate the mapping of the runtime resource to the assets in the hierarchy.

At step 808, a security action is performed with regard to an identified asset, which is included among the assets in the hierarchy, based at least on the security vulnerability being identified and further based at least on the runtime resource being automatically mapped to the identified asset on behalf of the developer. In an example implementation, the action logic 918 performs an action 956, including the security action, with regard to the identified asset. In an aspect, the action logic 918 determines that the runtime resource has the security vulnerability by analyzing the issue information 942 and determines that the runtime resource is mapped to the identified asset by analyzing the map 944. In another aspect, the action logic 918 identifies the identified asset (e.g., a configuration of the identified asset) as a source of the security vulnerability by comparing attributes of the assets in the hierarchy, which are indicated by the hierarchy information 938. For example, the action logic 918 may determine a likelihood that each of the assets in the hierarchy is the source of the security issue based on the attributes of the respective asset. In accordance with this example, the action logic 918 may identify the identified asset as the source of the security vulnerability based on the likelihood associated with the identified asset being greater than or equal to the likelihood associated with each of the other assets in the hierarchy. Identifying the identified asset as the source of the security vulnerability in this manner may trigger the action logic 918 to perform the security action with regard to the identified asset.

In some example embodiments, one or more steps 802, 804, 806, and/or 808 of flowchart 800 may not be performed. Moreover, steps in addition to or in lieu of steps 802, 804, 806, and/or 808 may be performed. For instance, in an example embodiment, the method of flowchart 800 further includes adding start scripts to a beginning of respective jobs in a build of the code and end scripts to an end of the respective jobs. The start scripts are configured to query a daemon for first information regarding assets that are built prior to performance of the respective jobs. The end scripts are configured to query the daemon for second information regarding assets that are built and pushed by the respective jobs and third information regarding assets that are pulled during the build of the code. The second information indicates the hierarchy of the assets. In an example implementation, the script addition logic 912 adds start scripts 948 to a beginning of respective jobs 946 in a build of the code and end scripts 950 to an end of the respective jobs 946. The start scripts 948 query the daemon for the first information regarding assets that are built prior to performance of the respective jobs 946. The end scripts 950 query the daemon for the second information regarding assets that are built and pushed by the respective jobs 946 and the third information regarding assets that are pulled during the build of the code. In accordance with this embodiment, identifying the hierarchy of the assets at step 802 is performed by reviewing the second information.

In an aspect of this embodiment, identifying the hierarchy of the assets at step 802 further includes triggering extraction of logs associated with the end scripts based at least on a build completion event, which indicates completion of the build of the code. A first subset of the logs includes the second information. A second subset of the logs includes the third information. In an example implementation, the extraction logic 922 triggers extraction of script logs 934 associated with the end scripts 950 from the asset information 952 based at least on receipt of a build completion event 932, which is generated as a result of the build of the code being completed. In accordance with this aspect, identifying the hierarchy of the assets at step 802 further includes filtering the logs to obtain the first subset of the logs, which includes the second information, and to disregard the second subset of the logs, which includes the third information. In an example implementation, the filtering logic 924 filters the script logs 934 to obtain the first subset of the logs and to disregard the second subset of the logs.

It will be recognized that the computing system 900 may not include one or more of the development-to-runtime mapping logic 910, the script addition logic 912, the identification logic 914, the mapping logic 916, the action logic 918, the user interface logic 920, the extraction logic 922, the filtering logic 924, the identifier assignment logic 926, the issue determination logic 928, and/or the store 930. Furthermore, the computing system 900 may include components in addition to or in lieu of the development-to-runtime mapping logic 910, the script addition logic 912, the identification logic 914, the mapping logic 916, the action logic 918, the user interface logic 920, the extraction logic 922, the filtering logic 924, the identifier assignment logic 926, the issue determination logic 928, and/or the store 930.

Some example use cases in which start scripts are added to the beginning of respective jobs in a build of the code (e.g., in a pipeline or workflow) and in which end scripts are added to the end of the respective jobs will now be described. In a first example use case, the start scripts query a local docker daemon for initial images information (e.g., digests, registry name, and repository name) and capture the identifier of the first image existing in the docker daemon. In accordance with this use case, the images are already sorted in descending timestamp order by the docker daemon. In further accordance with this example use case, the end scripts query the docker daemon for final images information (e.g., any new docker images that were built and pushed by the job, the pipeline start time, any images that were pulled as part of the building process). The filter option of the docker CLI command may be used to filter out the pre-existing images and to focus on the newer images that were built or pulled into the existing pipeline. The pipeline start time helps filter out the images that were pulled into the pipeline from the images that were built using the pipeline. In further accordance with this use case, the output is written into the pipeline logs and/or workflow logs.

FIG. 10 depicts an example start script 1000, which may be added to the beginning of any one or more jobs in a build of code, in accordance with an embodiment. For instance, the start script 1000 may be utilized in any of the example embodiments described herein to extract information regarding assets that are built prior to performance of the respective jobs.

FIG. 11 depicts an example end script, which may be added to the end of any one or more jobs in a build of code, in accordance with an embodiment. For instance, the end script 1100 may be utilized in any of the example embodiments described herein to extract information regarding assets that are built and pushed by the respective jobs and information regarding assets that are pulled during the build of the code.

Because start scripts and end scripts that are added to jobs in a build of code may interfere with pipelines or workflows, a guarantee may be provided that the scripts will never fail or hang and will not break the pipelines or workflows (e.g., ADO continueOnError and timeoutInMinutes control options). The scripts may be lightweight to ensure minimal delay is added to the build runtime. For instance, the average runtime for the scripts may be less than 0.5 seconds. Heavier processing may be performed on the backend.

In an example Azure® DevOps use case, pipeline decorators may be used to automatically push the start scripts and end scripts to pipeline jobs. Pipeline decorators enable a developer to add steps to the beginning and the end of every job in an Azure® DevOps pipeline. This process is different than adding steps to a single definition because it applies to all pipelines in an organization. In an aspect, only private extensions are capable of contributing pipeline decorators. In accordance with this use case, the extensions are authored and shared with an organization prior to being used. An update to an extension automatically flows to the customer's pipeline. FIG. 12 depicts an example pipeline 1200 in which an extension is automatically added in accordance with an embodiment.

FIG. 13 depicts a job 1300 in which decorators are automatically added in accordance with an embodiment. To provide customers an automated onboarding experience, when a customer creates an Azure® DevOps connector, the decorators extension is shared with the customer and installed automatically on behalf of the customer. For instance, when the Azure® DevOps connector is created, a DfD provisioning workflow may share a private extension (e.g., hosted in VS Marketplace™) with the customer. The DfD provisioning workflow may run an extension install command on behalf of the customer, which enables the extension decorators on future pipeline executions within the customer's organization.

In an example implementation, an entity that has a permission to programmatically share a private extension is identified, and an account that has the permission is added as a contributor to the DFD Marketplace Publisher account. The Visual Studio® Marketplace typically does not support managed identities or service principals. Accordingly, a "non-people" user account may be registered in Core Identity for this purpose. The DfD provisioning workflow may use a PAT from this account with an expiration time of 90 days or less. The PAT may be stored in a Key Vault and be onboarded to OneBranch automatic secret rotation. In accordance with this implementation, after the extension is shared, the extension is installed on the customer's account. To this end, an OAuth bearer token that is already created for the customer may be used when the customer onboards. Appropriate permissions (e.g., vso.gallery.manage and vso-.extension.manage) may be added to the OAuth bearer token to enable the OAuth bearer token to be used for purposes of installing the extension on the customer's account. In accordance with this implementation, onboarding of the customer may be fully automated.

In an example GitHub® use case, GitHub Actions provides an interface to execute the start script and the end script in a job using the GitHub® action syntax. The start script and the end script may be added to the existing GitHub® action for Defender for DevOps™, for example, or by adding a new action. In an example, the customer may add the action with its start script and end script option, to every job in a workflow that pushes an image to the cloud repository. In another example the customer may add the action to every job in the workflow.

In accordance with the example Azure® DevOps use case mentioned above, a backend service listens on build completion events coming from a DevOps webhook or service hook, which enables subscribing to events (e.g., build completion events, workflow run completion events, pipeline completion events). The build completion events trigger the functionality for extracting and processing the logs associated with the start scripts and the end scripts (i.e., the script logs) using the DevOps application programming interface (API). In accordance with this use case, the provider of the scripts has full control of the script logs with no dependency on DevOps specific logs.

In further accordance with the example Azure® DevOps use case, the logs of the completed build are fetched via the ADO Rest API. The logs URI is fetched from the build completion event received by the ADO service hook. The logs include new image digests that were built as part of the pipeline and the list of image digests that were pulled into the docker daemon as part of building the new images. The "Pipeline Start Time" may be used to filter out the images that were pulled into the daemon, which leaves the digests of the images that were built in the pipeline or workflow. The digests of the images that were built in the pipeline or workflow and external metadata from the build completion event are parsed and saved in storage.

For thoroughness, FIG. 14 depicts example output 1400 of a start script in accordance with an embodiment, and FIG. 15 depicts example output 1500 of an end script for a job that built and pushed an image in accordance with an embodiment.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the development-to-runtime mapping logic 110, the development-to-runtime mapping logic 910, the script addition logic 912, the identification logic 914, the mapping logic 916, the action logic 918, the user interface logic 920, the extraction logic 922, the filtering logic 924, the identifier assignment logic 926, the issue determination logic 928, flowchart 200, flowchart 300, flowchart 400, flowchart 500, flowchart 600, flowchart 700, and/or flowchart 800 may be implemented in hardware, software, firmware, or any combination thereof.

For example, any one or more of the development-to-runtime mapping logic 110, the development-to-runtime mapping logic 910, the script addition logic 912, the identification logic 914, the mapping logic 916, the action logic 918, the user interface logic 920, the extraction logic 922, the filtering logic 924, the identifier assignment logic 926, the issue determination logic 928, flowchart 200, flowchart 300, flowchart 400, flowchart 500, flowchart 600, flowchart 700, and/or flowchart 800 may be implemented, at least in part, as computer program code configured to be executed in one or more processors.

In another example, any one or more of the development-to-runtime mapping logic 110, the development-to-runtime mapping logic 910, the script addition logic 912, the identification logic 914, the mapping logic 916, the action logic 918, the user interface logic 920, the extraction logic 922, the filtering logic 924, the identifier assignment logic 926, the issue determination logic 928, flowchart 200, flowchart 300, flowchart 400, flowchart 500, flowchart 600, flowchart 700, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 16:
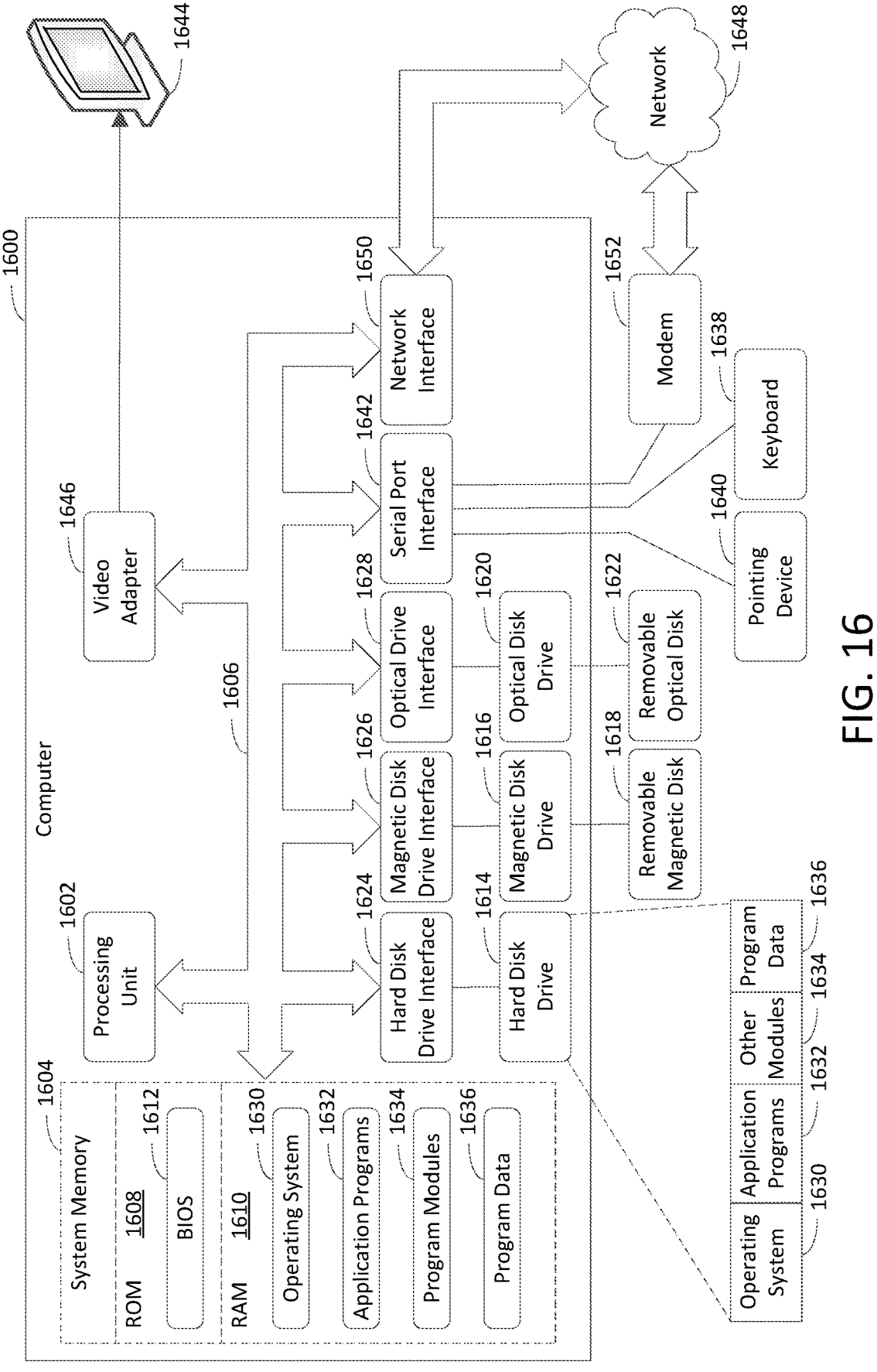
FIG. 16 depicts an example computer in which embodiments may be implemented.

II. Further Discussion of Some Example Embodiments (A1) A first example system (FIG. 1, 102A-102M, 106A-106N; FIG. 9, 900; FIG. 16, 1600) comprises memory (FIG. 16, 1604, 1608, 1610) and a processing system (FIG. 16, 1602) coupled to the memory. The processing system is configured to automatically identify (FIG. 2, 202) a hierarchy of assets (FIG. 1, 108) that are utilized during development of code on a user machine (FIG. 1, 102A-102M) such that the assets in the hierarchy are included in respective hierarchical levels that correspond to respective asset types. A first asset in a relatively higher hierarchical level of the hierarchy includes a second asset in a relatively lower hierarchical level of the hierarchy. The processing system is further configured to map (FIG. 2, 204) a runtime resource (FIG. 1, 112), which is created by deployment of the code on a server machine (FIG. 1, 106A-106N) that is coupled to the user machine via a network (FIG. 1, 104), to the assets in the hierarchy based at least on the assets being utilized during development of the code and further based at least on the runtime resource being created by the deployment of the code. The processing system is further configured to perform (FIG. 2, 206) an action (FIG. 9, 956) with regard to an identified asset, which is included among the assets in the hierarchy, based at least on the runtime resource being mapped to the identified asset.

(A2) In the example system of A1, wherein the processing system is configured to: add start scripts to a beginning of respective jobs in a build of the code and end scripts to an end of the respective jobs, the start scripts configured to query a daemon for first information regarding assets that are built prior to performance of the respective jobs, the end scripts configured to query the daemon for second information regarding assets that are built and pushed by the respective jobs and third information regarding assets that are pulled during the build of the code, the second information indicating the hierarchy of the assets; and automatically identify the hierarchy of the assets by reviewing the second information.

(A3) In the example system of any of A1-A2, wherein the processing system is configured to: trigger extraction of logs associated with the end scripts based at least on a build completion event, which indicates completion of the build of the code, wherein a first subset of the logs includes the second information, wherein a second subset of the logs includes the third information; and filter the logs to obtain the first subset of the logs, which includes the second information, and to disregard the second subset of the logs, which includes the third information.

(A4) In the example system of any of A1-A3, wherein the processing system is configured to: automatically map the runtime resource to the assets in the hierarchy based at least on the assets being utilized during development of the code and further based at least on the runtime resource being created by the deployment of the code; and perform the action with regard to the identified asset based at least on the runtime resource being automatically mapped to the identified asset.

(A5) In the example system of any of A1-A4, wherein the processing system is configured to: perform the action with regard to a repository from which the code is deployed based at least on the runtime resource being mapped to the repository; and wherein the assets in the hierarchy include the repository.

(A6) In the example system of any of A1-A5, wherein the processing system is configured to: map a container image, which includes the code and additional code that enables the code to run, to the assets in the hierarchy based at least on the assets being utilized during development of the code and further based at least on the container image being created by the deployment of the code; and perform the action with regard to the identified asset based at least on the container image being mapped to the identified asset.

(A7) In the example system of any of A1-A6, wherein the processing system is configured to: assign a unique identifier to the runtime resource; and assign a plurality of identifiers to the assets in the hierarchy; map the unique identifier assigned to the runtime resource to the plurality of identifiers assigned to the assets in the hierarchy; and perform the action with regard to the identified asset based at least on the unique identifier assigned to the runtime resource being mapped to an identifier assigned to the identified asset; and wherein the plurality of identifiers includes the identifier assigned to the identified asset.

(A8) In the example system of any of A1-A7, wherein the processing system is configured to: automatically identify the hierarchy of the assets that are utilized during the development of the code by analyzing a build of the code; store a representation of the hierarchy in a store; identify a representation of the identified asset in the representation of the hierarchy that is stored in the store; and perform the action with regard to the identified asset based at least on identification of the representation of the identified asset in the representation of the hierarchy that is stored in the store.

(A9) In the example system of any of A1-A8, wherein the processing system is configured to: map a plurality of runtime resources, which are created by deployment of the code on the server machine, to the assets in the hierarchy based at least on the assets being utilized during development of the code and further based at least on the plurality of runtime resources being created by the deployment of the code; receive a request for an indication of runtime resources that are associated with the identified asset; and generate a message, which indicates the plurality of runtime resources, in response to the request, based at least on the plurality of runtime resources being mapped to the identified asset.

(A10) In the example system of any of A1-A9, wherein the processing system is configured to: identify a security vulnerability associated with the runtime resource; based at least on the runtime resource being mapped to the identified asset, map the security vulnerability to the identified asset; and address the security vulnerability by performing a remedial action with regard to the identified asset based at least on the security vulnerability being mapped to the identified asset.

(A11) In the example system of any of A1-A10, wherein the processing system is configured to: establish an asset-specific policy that defines a rule to be enforced with regard to the identified asset; and wherein the asset-specific policy is specific to the identified asset.

(A12) In the example system of any of A1-A11, wherein the processing system is configured to: provide a notification to a developer of the code via a graphical user interface, the notification suggesting an action to be initiated by the developer with regard to the identified asset to mitigate the security vulnerability.

(A13) In the example system of any of A1-A12, wherein the processing system is configured to: generate a graphical user interface that includes a plurality of selectable interface elements representing a plurality of respective runtime resources that includes the runtime resource that is created by deployment of the code on the server machine, the selectable interface elements configured such that selection of the selectable interface elements initiates monitoring of the respective runtime resources for security vulnerabilities; receive an instruction from a developer of the code, the instruction indicating selection of a selectable interface element representing the runtime resource that is created by deployment of the code on the server machine; initiate monitoring of the runtime resource that is created by deployment of the code on the server machine for security vulnerabilities based at least on receipt of the instruction from the developer; and identify the security vulnerability associated with the runtime resource as a result of monitoring the runtime resource.

(A14) In the example system of any of A1-A13, wherein the processing system is further configured to: generate a graphical user interface that includes a first interface element representing the runtime resource and a second interface element representing the identified asset; wherein an arrangement of the first interface element and the second interface element in the graphical user interface indicates a relationship between the runtime resource and the identified asset.

(A15) In the example system of any of A1-A14, wherein the processing system is configured to: determine an issue regarding the runtime resource; and change a configuration of the identified asset, which is included among the assets in the hierarchy, based at least on the runtime resource being mapped to the identified asset and further based at least on the issue regarding the runtime resource being determined.

(B1) A second example system (FIG. 1, 102A-102M, 106A-106N; FIG. 9, 900; FIG. 16, 1600) comprises memory (FIG. 16, 1604, 1608, 1610) and a processing system (FIG. 16, 1602) coupled to the memory. The processing system is configured to automatically identify (FIG. 8, 802) a hierarchy of assets (FIG. 1, 108) that are utilized during development of code on a user machine (FIG. 1, 102A-102M) such that the assets in the hierarchy are included in respective hierarchical levels that correspond to respective asset types. A first asset in a relatively higher hierarchical level of the hierarchy includes a second asset in a relatively lower hierarchical level of the hierarchy. The processing system is further configured to identify (FIG. 8, 804) a security vulnerability associated with a runtime resource (FIG. 1, 112) that is created by deployment of the code on a server machine (FIG. 1, 106A-106N) that is coupled to the user machine via a network (FIG. 1, 104). The processing system is further configured to automatically map (FIG. 8, 806) the runtime resource to the assets in the hierarchy on behalf of a developer of the code. The processing system is further configured to perform (FIG. 8, 808) a security action (FIG. 9, 956) with regard to an identified asset, which is included among the assets in the hierarchy, based at least on the security vulnerability being identified and further based at least on the runtime resource being automatically mapped to the identified asset on behalf of the developer.

(B2) In the example system of B1, wherein the first asset in the relatively higher hierarchical level is a build of the code; and wherein the second asset in the relatively lower hierarchical level is a line of the code.

(B3) In the example system of any of B1-B2, wherein the processing system is configured to: add start scripts to a beginning of respective jobs in a build of the code and end scripts to an end of the respective jobs, the start scripts configured to query a daemon for first information regarding assets that are built prior to performance of the respective jobs, the end scripts configured to query the daemon for second information regarding assets that are built and pushed by the respective jobs and third information regarding assets that are pulled during the build of the code, the second information indicating the hierarchy of the assets; and automatically identify the hierarchy of the assets by reviewing the second information.

(B4) In the example system of any of B1-B3, wherein the processing system is configured to: trigger extraction of logs associated with the end scripts based at least on a build completion event, which indicates completion of the build of the code, wherein a first subset of the logs includes the second information, wherein a second subset of the logs includes the third information; and filter the logs to obtain the first subset of the logs, which includes the second information, and to disregard the second subset of the logs, which includes the third information.

(C1) A first example method is implemented by a computing system (FIG. 1, 102A-102M, 106A-106N; FIG. 9, 900; FIG. 16, 1600). The method comprises automatically identifying (FIG. 2, 202) a hierarchy of assets (FIG. 1, 108) that are utilized during development of code on a user machine (FIG. 1, 102A-102M) such that the assets in the hierarchy are included in respective hierarchical levels that correspond to respective asset types. A first asset in a relatively higher hierarchical level of the hierarchy includes a second asset in a relatively lower hierarchical level of the hierarchy. The method further comprises mapping (FIG. 2, 204) a runtime resource (FIG. 1, 112), which is created by deployment of the code on a server machine (FIG. 1, 106A-106N) that is coupled to the user machine via a network (FIG. 1, 104), to the assets in the hierarchy based at least on the assets being utilized during development of the code and further based at least on the runtime resource being created by the deployment of the code. The method further comprises performing (FIG. 2, 206) an action (FIG. 9, 956) with regard to an identified asset, which is included among the assets in the hierarchy, based at least on the runtime resource being mapped to the identified asset.

(C2) In the method of C1, further comprising: adding start scripts to a beginning of respective jobs in a build of the code and end scripts to an end of the respective jobs, the start scripts configured to query a daemon for first information regarding assets that are built prior to performance of the respective jobs, the end scripts configured to query the daemon for second information regarding assets that are built and pushed by the respective jobs and third information regarding assets that are pulled during the build of the code, the second information indicating the hierarchy of the assets; wherein automatically identifying the hierarchy of the assets is performed by reviewing the second information.

(C3) In the method of any of C1-C2, wherein automatically identifying the hierarchy of the assets further comprises: triggering extraction of logs associated with the end scripts based at least on a build completion event, which indicates completion of the build of the code, wherein a first subset of the logs includes the second information, wherein a second subset of the logs includes the third information; and filtering the logs to obtain the first subset of the logs, which includes the second information, and to disregard the second subset of the logs, which includes the third information.

(C4) In the method of any of C1-C3, wherein mapping the runtime resource comprises: automatically mapping the runtime resource to the assets in the hierarchy based at least on the assets being utilized during development of the code and further based at least on the runtime resource being created by the deployment of the code; and wherein performing the action comprises: performing the action with regard to the identified asset based at least on the runtime resource being automatically mapped to the identified asset.

(C5) In the method of any of C1-C4, wherein performing the action comprises: performing the action with regard to a repository from which the code is deployed based at least on the runtime resource being mapped to the repository; and wherein the assets in the hierarchy include the repository.

(C6) In the method of any of C1-C5, wherein mapping the runtime resource comprises: mapping a container image, which includes the code and additional code that enables the code to run, to the assets in the hierarchy based at least on the assets being utilized during development of the code and further based at least on the container image being created by the deployment of the code; and wherein performing the action comprises: performing the action with regard to the identified asset based at least on the container image being mapped to the identified asset.

(C7) In the method of any of C1-C6, further comprising: assigning a unique identifier to the runtime resource; and assigning a plurality of identifiers to the assets in the hierarchy; wherein mapping the runtime resource to the assets in the hierarchy comprises: mapping the unique identifier assigned to the runtime resource to the plurality of identifiers assigned to the assets in the hierarchy; wherein performing the action comprises: performing the action with regard to the identified asset based at least on the unique identifier assigned to the runtime resource being mapped to an identifier assigned to the identified asset; and wherein the plurality of identifiers includes the identifier assigned to the identified asset.

(C8) In the method of any of C1-C7, wherein automatically identifying the hierarchy of the assets comprises: automatically identifying the hierarchy of the assets that are utilized during the development of the code by analyzing a build of the code; wherein the method further comprises: storing a representation of the hierarchy in a store; and identifying a representation of the identified asset in the representation of the hierarchy that is stored in the store; and wherein performing the action with regard to the identified asset is based at least on identification of the representation of the identified asset in the representation of the hierarchy that is stored in the store.

(C9) In the method of any of C1-C8, wherein mapping the runtime resource to the assets in the hierarchy comprises: mapping a plurality of runtime resources, which are created by deployment of the code on the server machine, to the assets in the hierarchy based at least on the assets being utilized during development of the code and further based at least on the plurality of runtime resources being created by the deployment of the code; wherein the method further comprises: receiving a request for an indication of runtime resources that are associated with the identified asset; and wherein performing the action comprises: generating a message, which indicates the plurality of runtime resources, in response to the request, based at least on the plurality of runtime resources being mapped to the identified asset.

(C10) In the method of any of C1-C9, further comprising: identifying a security vulnerability associated with the runtime resource; and based at least on the runtime resource being mapped to the identified asset, mapping the security vulnerability to the identified asset; wherein performing the action comprises: addressing the security vulnerability by performing a remedial action with regard to the identified asset based at least on the security vulnerability being mapped to the identified asset.

(C11) In the method of any of C1-C10, wherein performing the remedial action comprises: establishing an asset-specific policy that defines a rule to be enforced with regard to the identified asset; and wherein the asset-specific policy is specific to the identified asset.

(C12) In the method of any of C1-C11, wherein performing the remedial action comprises: providing a notification to a developer of the code via a graphical user interface, the notification suggesting an action to be initiated by the developer with regard to the identified asset to mitigate the security vulnerability.

(C13) In the method of any of C1-C12, further comprising: generating a graphical user interface that includes a plurality of selectable interface elements representing a plurality of respective runtime resources that includes the runtime resource that is created by deployment of the code on the server machine, the selectable interface elements configured such that selection of the selectable interface elements initiates monitoring of the respective runtime resources for security vulnerabilities; receiving an instruction from a developer of the code, the instruction indicating selection of a selectable interface element representing the runtime resource that is created by deployment of the code on the server machine; and initiating monitoring of the runtime resource that is created by deployment of the code on the server machine for security vulnerabilities based at least on receipt of the instruction from the developer; wherein identifying the security vulnerability associated with the runtime resource is performed as a result of monitoring the runtime resource.

(C14) In the method of any of C1-C13, further comprising: generating a graphical user interface that includes a first interface element representing the runtime resource and a second interface element representing the identified asset; wherein an arrangement of the first interface element and the second interface element in the graphical user interface indicates a relationship between the runtime resource and the identified asset.

(C15) In the method of any of C1-C14, further comprising: determining an issue regarding the runtime resource; wherein performing the action comprises: changing a configuration of the identified asset, which is included among the assets in the hierarchy, based at least on the runtime resource being mapped to the identified asset and further based at least on the issue regarding the runtime resource being determined.

(D1) A second example method is implemented by a computing system (FIG. 1, 102A-102M, 106A-106N; FIG. 9, 900; FIG. 16, 1600). The method comprises automatically identifying (FIG. 8, 802) a hierarchy of assets (FIG. 1, 108) that are utilized during development of code on a user machine (FIG. 1, 102A-102M) such that the assets in the hierarchy are included in respective hierarchical levels that correspond to respective asset types. A first asset in a relatively higher hierarchical level of the hierarchy includes a second asset in a relatively lower hierarchical level of the hierarchy. The method further comprises identifying (FIG. 8, 804) a security vulnerability associated with a runtime resource (FIG. 1, 112) that is created by deployment of the code on a server machine (FIG. 1, 106A-106N) that is coupled to the user machine via a network (FIG. 1, 104). The method further comprises automatically mapping (FIG. 8, 806) the runtime resource to the assets in the hierarchy on behalf of a developer of the code. The method further comprises performing (FIG. 8, 808) a security action (FIG. 9, 956) with regard to an identified asset, which is included among the assets in the hierarchy, based at least on the security vulnerability being identified and further based at least on the runtime resource being automatically mapped to the identified asset on behalf of the developer.

(D2) In the method of D1, wherein the first asset in the relatively higher hierarchical level is a build of the code; and wherein the second asset in the relatively lower hierarchical level is a line of the code.

(D3) In the method of any of D1-D2, further comprising: adding start scripts to a beginning of respective jobs in a build of the code and end scripts to an end of the respective jobs, the start scripts configured to query a daemon for first information regarding assets that are built prior to performance of the respective jobs, the end scripts configured to query the daemon for second information regarding assets that are built and pushed by the respective jobs and third information regarding assets that are pulled during the build of the code, the second information indicating the hierarchy of the assets; wherein automatically identifying the hierarchy of the assets is performed by reviewing the second information.

(D4) In the method of any of D1-D3, wherein automatically identifying the hierarchy of the assets further comprises: triggering extraction of logs associated with the end scripts based at least on a build completion event, which indicates completion of the build of the code, wherein a first subset of the logs includes the second information, wherein a second subset of the logs includes the third information; and filtering the logs to obtain the first subset of the logs, which includes the second information, and to disregard the second subset of the logs, which includes the third information.

(E1) A first example computer program product (FIG. 16, 1618, 1622) comprising a computer-readable storage medium having instructions recorded thereon for enabling a processor-based system (FIG. 1, 102A-102M, 106A-106N; FIG. 9, 900; FIG. 16, 1600) to perform operations. The operations comprise automatically identifying (FIG. 2, 202) a hierarchy of assets (FIG. 1, 108) that are utilized during development of code on a user machine (FIG. 1, 102A-102M) such that the assets in the hierarchy are included in respective hierarchical levels that correspond to respective asset types. A first asset in a relatively higher hierarchical level of the hierarchy includes a second asset in a relatively lower hierarchical level of the hierarchy. The operations further comprise mapping (FIG. 2, 204) a runtime resource (FIG. 1, 112), which is created by deployment of the code on a server machine (FIG. 1, 106A-106N) that is coupled to the user machine via a network (FIG. 1, 104), to the assets in the hierarchy based at least on the assets being utilized during development of the code and further based at least on the runtime resource being created by the deployment of the code. The operations further comprise performing (FIG. 2, 206) an action (FIG. 9, 956) with regard to an identified asset, which is included among the assets in the hierarchy, based at least on the runtime resource being mapped to the identified asset.

(F1) A second example computer program product (FIG. 16, 1618, 1622) comprising a computer-readable storage medium having instructions recorded thereon for enabling a processor-based system (FIG. 1, 102A-102M, 106A-106N; FIG. 9, 900; FIG. 16, 1600) to perform operations. The operations comprise automatically identifying (FIG. 8, 802) a hierarchy of assets (FIG. 1, 108) that are utilized during development of code on a user machine (FIG. 1, 102A-102M) such that the assets in the hierarchy are included in respective hierarchical levels that correspond to respective asset types. A first asset in a relatively higher hierarchical level of the hierarchy includes a second asset in a relatively lower hierarchical level of the hierarchy. The operations further comprise identifying (FIG. 8, 804) a security vulnerability associated with a runtime resource (FIG. 1, 112) that is created by deployment of the code on a server machine (FIG. 1, 106A-106N) that is coupled to the user machine via a network (FIG. 1, 104). The operations further comprise automatically mapping (FIG. 8, 806) the runtime resource to the assets in the hierarchy on behalf of a developer of the code. The operations further comprise performing (FIG. 8, 808) a security action (FIG. 9, 956) with regard to an identified asset, which is included among the assets in the hierarchy, based at least on the security vulnerability being identified and further based at least on the runtime resource being automatically mapped to the identified asset on behalf of the developer.

III. Example Computer System

FIG. 16 depicts an example computer 1600 in which embodiments may be implemented. Any one or more of the user devices 102A-102M and/or any one or more of the servers 106A-106N shown in FIG. 1 and/or computing system 900 shown in FIG. 9 may be implemented using computer 1600, including one or more features of computer 1600 and/or alternative features. Computer 1600 may be a general-purpose computing device in the form of a conventional personal computer, a mobile computer, or a workstation, for example, or computer 1600 may be a special purpose computing device. The description of computer 1600 provided herein is provided for purposes of illustration, and is not intended to be limiting. Embodiments may be implemented in further types of computer systems, as would be known to persons skilled in the relevant art(s).

As shown in FIG. 16, computer 1600 includes a processing unit 1602, a system memory 1604, and a bus 1606 that couples various system components including system memory 1604 to processing unit 1602. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computer 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1630, one or more application programs 1632, other program modules 1634, and program data 1636. Application programs 1632 or program modules 1634 may include, for example, computer program logic for implementing any one or more of (e.g., at least a portion of) the development-to-runtime mapping logic 110, the development-to-runtime mapping logic 910, the script addition logic 912, the identification logic 914, the mapping logic 916, the action logic 918, the user interface logic 920, the extraction logic 922, the filtering logic 924, the identifier assignment logic 926, the issue determination logic 928, flowchart 200 (including any step of flowchart 200), flowchart 300 (including any step of flowchart 300), flowchart 400 (including any step of flowchart 400), flowchart 500 (including any step of flowchart 500), flowchart

600 (including any step of flowchart 600), flowchart 700 (including any step of flowchart 700), and/or flowchart 800 (including any step of flowchart 800), as described herein.

A user may enter commands and information into the computer 1600 through input devices such as keyboard 1638 and pointing device 1640. Other input devices (not shown) may include a microphone, joystick, game pad, satellite dish, scanner, touch screen, camera, accelerometer, gyroscope, or the like. These and other input devices are often connected to the processing unit 1602 through a serial port interface 1642 that is coupled to bus 1606, but may be connected by other interfaces, such as a parallel port, game port, or a universal serial bus (USB).

A display device 1644 (e.g., a monitor) is also connected to bus 1606 via an interface, such as a video adapter 1646. In addition to display device 1644, computer 1600 may include other peripheral output devices (not shown) such as speakers and printers.

Computer 1600 is connected to a network 1648 (e.g., the Internet) through a network interface or adapter 1650, a modem 1652, or other means for establishing communications over the network. Modem 1652, which may be internal or external, is connected to bus 1606 via serial port interface 1642.

As used herein, the terms "computer program medium" and "computer-readable storage medium" are used to generally refer to media (e.g., non-transitory media) such as the hard disk associated with hard disk drive 1614, removable magnetic disk 1618, removable optical disk 1622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650 or serial port interface 1642. Such computer programs, when executed or loaded by an application, enable computer 1600 to implement features of embodiments discussed herein. Accordingly, such computer programs represent controllers of the computer 1600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   a processing system coupled to the memory, the processing system configured to:
   automatically identify a hierarchy that includes assets that are utilized during development of code on a user machine such that the assets in the hierarchy are included in respective hierarchical levels that correspond to respective asset types, wherein a first asset in a higher hierarchical level of the hierarchy includes a second asset in a lower hierarchical level of the hierarchy;
   map a runtime resource, which is created by deployment of the code on a server machine that is coupled to the user machine via a network, to the assets in the hierarchy based at least on the assets being utilized during development of the code and further based at least on the runtime resource being created by the deployment of the code;

generate a graphical user interface that includes a plurality of interface elements representing a plurality of respective runtime resources that includes the runtime resource that is created by deployment of the code on the server machine, the interface elements configured such that selection of the interface elements initiates monitoring of the respective runtime resources for security vulnerabilities;

receive an instruction that indicates selection of an interface element representing the runtime resource that is created by deployment of the code on the server machine;

initiate monitoring of the runtime resource that is created by deployment of the code on the server machine for security vulnerabilities as a result of receiving the instruction;

identify a security vulnerability associated with the runtime resource as a result of the runtime resource being monitored;

as a result of the runtime resource being mapped to an asset in the hierarchy, identify the asset as a source of the security vulnerability; and as a result of the asset being identified as the source of the security vulnerability associated with the runtime resource, address the security vulnerability by performing a remedial action with regard to the asset.

2. The system of claim 1, wherein the processing system is configured to:

add start scripts to a beginning of respective jobs in a build of the code and end scripts to an end of the respective jobs, the start scripts configured to query a daemon for first information regarding assets that are built prior to performance of the respective jobs, the end scripts configured to query the daemon for second information regarding assets that are built and pushed by the respective jobs and third information regarding assets that are pulled during the build of the code, the second information indicating the hierarchy of the assets; and automatically identify the hierarchy of the assets by reviewing the second information.

3. The system of claim 2, wherein the processing system is configured to:

trigger extraction of logs associated with the end scripts based at least on a build completion event, which indicates completion of the build of the code, wherein a first subset of the logs includes the second information, wherein a second subset of the logs includes the third information; and filter the logs to obtain the first subset of the logs, which includes the second information, and to disregard the second subset of the logs, which includes the third information.

4. The system of claim 1, wherein the processing system is configured to:

automatically map the runtime resource to the assets in the hierarchy based at least on the assets being utilized during development of the code and further based at least on the runtime resource being created by the deployment of the code; and perform the action with regard to the asset based at least on the runtime resource being automatically mapped to the asset.

5. The system of claim 1, wherein the processing system is configured to:

assign a unique identifier to the runtime resource;

assign a plurality of identifiers to the assets in the hierarchy;

map the unique identifier assigned to the runtime resource to the plurality of identifiers assigned to the assets in the hierarchy; and perform the action with regard to the asset based at least on the unique identifier assigned to the runtime resource being mapped to an identifier assigned to the asset; and wherein the plurality of identifiers includes the identifier assigned to the asset.

6. The system of claim 1, wherein the processing system is configured to:

automatically identify the hierarchy of the assets that are utilized during the development of the code by analyzing a build of the code;

store a representation of the hierarchy in a store;

identify a representation of the asset in the representation of the hierarchy that is stored in the store; and perform the action with regard to the asset based at least on identification of the representation of the asset in the representation of the hierarchy that is stored in the store.

7. The system of claim 1, wherein the processing system is configured to:

establish an asset-specific policy that defines a rule to be enforced with regard to the asset; and wherein the asset-specific policy is specific to the asset.

8. The system of claim 1, wherein the processing system is configured to:

provide a notification to a developer of the code via a graphical user interface, the notification suggesting an action to be initiated by the developer with regard to the asset to mitigate the security vulnerability.

9. A method implemented by a computing system, the method comprising:

automatically identifying a hierarchy that includes assets that are utilized during development of code on a user machine such that the assets in the hierarchy are included in respective hierarchical levels that correspond to respective asset types, wherein a first asset in a higher hierarchical level of the hierarchy includes a second asset in a lower hierarchical level of the hierarchy;

mapping a runtime resource, which is created by deployment of the code on a server machine that is coupled to the user machine via a network, to the assets in the hierarchy based at least on the assets being utilized during development of the code and further based at least on the runtime resource being created by the deployment of the code;

generating a graphical user interface that includes a plurality of interface elements representing a plurality of respective runtime resources that includes the runtime resource that is created by deployment of the code on the server machine, the interface elements configured such that selection of the interface elements initiates monitoring of the respective runtime resources for security vulnerabilities;

receiving an instruction from a developer of the code, the instruction indicating selection of an interface element representing the runtime resource that is created by deployment of the code on the server machine;

initiating monitoring of the runtime resource that is created by deployment of the code on the server machine for security vulnerabilities as a result of receiving the instruction from the developer;

identifying a security vulnerability associated with the runtime resource as a result of monitoring the runtime resource;

as a result of the runtime resource being mapped to an asset in the hierarchy, mapping the security vulnerability to the asset; and as a result of the security vulnerability being mapped to the asset, addressing the security vulnerability by performing a remedial action with regard to the asset.

10. The method of claim 9, further comprising:

adding start scripts to a beginning of respective jobs in a build of the code and end scripts to an end of the respective jobs, the start scripts configured to query a daemon for first information regarding assets that are built prior to performance of the respective jobs, the end scripts configured to query the daemon for second information regarding assets that are built and pushed by the respective jobs and third information regarding assets that are pulled during the build of the code, the second information indicating the hierarchy of the assets;

wherein automatically identifying the hierarchy of the assets is performed by reviewing the second information.

11. The method of claim 10, wherein automatically identifying the hierarchy of the assets further comprises:

triggering extraction of logs associated with the end scripts based at least on a build completion event, which indicates completion of the build of the code, wherein a first subset of the logs includes the second information, wherein a second subset of the logs includes the third information; and filtering the logs to obtain the first subset of the logs, which includes the second information, and to disregard the second subset of the logs, which includes the third information.

12. The method of claim 9, wherein performing the remedial action comprises:

performing the remedial action with regard to a repository from which the code is deployed based at least on the runtime resource being mapped to the repository; and wherein the assets in the hierarchy include the repository.

13. The method of claim 9, wherein mapping the runtime resource comprises:

mapping a container image, which includes the code and additional code that enables the code to run, to the assets in the hierarchy based at least on the assets being utilized during development of the code and further based at least on the container image being created by the deployment of the code; and wherein performing the action comprises:

performing the action with regard to the asset based at least on the container image being mapped to the asset.

14. The method of claim 9, wherein mapping the runtime resource to the assets in the hierarchy comprises:

mapping a plurality of runtime resources, which are created by deployment of the code on the server machine, to the assets in the hierarchy based at least on the assets being utilized during development of the code and further based at least on the plurality of runtime resources being created by the deployment of the code;

wherein the method further comprises:

receiving a request for an indication of runtime resources that are associated with the asset; and wherein performing the action comprises:

generating a message, which indicates the plurality of runtime resources, in response to the request, based at least on the plurality of runtime resources being mapped to the asset.

15. The method of claim 9, further comprising:

configuring the graphical user interface to include a first interface element representing the runtime resource and a second interface element representing the asset;

wherein an arrangement of the first interface element and the second interface element in the graphical user interface indicates a relationship between the runtime resource and the asset.

16. The method of claim 9, wherein performing the remedial action comprises:

changing a configuration of the asset.

17. The method of claim 9, wherein the first asset in the higher hierarchical level is a build of the code; and wherein the second asset in the lower hierarchical level is a line of the code.

18. A computer program product comprising a computer-readable storage medium having instructions recorded thereon for enabling a processor-based system to perform operations, the operations comprising:

automatically identifying a hierarchy that includes assets that are utilized during development of code on a user machine such that the assets in the hierarchy are included in respective hierarchical levels that correspond to respective asset types, wherein a first asset in a higher hierarchical level of the hierarchy includes a second asset in a lower hierarchical level of the hierarchy;

mapping a runtime resource, which is created by deployment of the code on a server machine that is coupled to the user machine via a network, to the assets in the hierarchy based at least on the assets being utilized during development of the code and further based at least on the runtime resource being created by the deployment of the code;

generating a graphical user interface that includes a plurality of interface elements representing a plurality of respective runtime resources that includes the runtime resource that is created by deployment of the code on the server machine, the interface elements configured such that selection of the interface elements initiates monitoring of the respective runtime resources for security vulnerabilities;

receiving an instruction that indicates selection of an interface element representing the runtime resource that is created by deployment of the code on the server machine;

initiating monitoring of the runtime resource that is created by deployment of the code on the server machine for security vulnerabilities as a result of receiving the instruction;

identifying a security vulnerability associated with the runtime resource as a result of the runtime resource being monitored;

as a result of the runtime resource being mapped to an asset in the hierarchy, identifying the asset as a source of the security vulnerability; and as a result of the asset being identified as the source of the security vulnerability associated with the runtime resource, addressing the security vulnerability by performing a remedial action with regard to the asset.

19. The computer program product of claim 18, wherein the first asset in the higher hierarchical level is a repository from which the code is deployed; and wherein the second asset in the lower hierarchical level is a branch of the code.

20. The computer program product of claim 18, wherein the operations further comprise:

adding start scripts to a beginning of respective jobs in a build of the code and end scripts to an end of the respective jobs, the start scripts configured to query a daemon for first information regarding assets that are built prior to performance of the respective jobs, the end scripts configured to query the daemon for second information regarding assets that are built and pushed by the respective jobs and third information regarding assets that are pulled during the build of the code, the second information indicating the hierarchy of the assets; and wherein automatically identifying the hierarchy of the assets is performed by reviewing the second information.

21. The computer program product of claim 20, wherein automatically identifying the hierarchy of the assets further comprises:

triggering extraction of logs associated with the end scripts based at least on a build completion event, which indicates completion of the build of the code, wherein a first subset of the logs includes the second information, wherein a second subset of the logs includes the third information; and filtering the logs to obtain the first subset of the logs, which includes the second information, and to disregard the second subset of the logs, which includes the third information.

\* \* \* \* \*